(12) United States Patent
Nakada

(10) Patent No.: US 9,046,685 B2
(45) Date of Patent: Jun. 2, 2015

(54) INFORMATION PROCESSING APPARATUS, CONTROL METHOD OF INFORMATION PROCESSING APPARATUS, AND TRANSMISSION HEAD-MOUNT TYPE DISPLAY DEVICE

(75) Inventor: Yuji Nakada, Osaka (JP)

(73) Assignee: SEIKO EPSON CORPORATION, Tokyo (JP)

( * ) Notice: Subject to any disclaimer, the term of this patent is extended or adjusted under 35 U.S.C. 154(b) by 238 days.

(21) Appl. No.: 13/398,124

(22) Filed: Feb. 16, 2012

(65) Prior Publication Data

US 2012/0218303 A1  Aug. 30, 2012

(30) Foreign Application Priority Data

Feb. 24, 2011  (JP) ................................. 2011-037787

(51) Int. Cl.
| | |
|---|---|
| *G09G 5/00* | (2006.01) |
| *G02B 27/01* | (2006.01) |
| *G06F 3/0482* | (2013.01) |
| *G06F 3/0481* | (2013.01) |
| *G06F 3/0489* | (2013.01) |

(52) U.S. Cl.
CPC ........ *G02B 27/017* (2013.01); *G02B 2027/014* (2013.01); *G02B 2027/0141* (2013.01); *G02B 2027/0178* (2013.01); *G06F 3/0482* (2013.01); *G06F 3/04817* (2013.01); *G06F 3/04892* (2013.01)

(58) Field of Classification Search
CPC .............. G06F 3/0482; G06F 3/04817; G06F 2200/1614; G09G 2340/0492
See application file for complete search history.

(56) References Cited

U.S. PATENT DOCUMENTS

| | | | | |
|---|---|---|---|---|
| 5,485,197 | A | * | 1/1996 | Hoarty ............................ 725/37 |
| 5,880,733 | A | * | 3/1999 | Horvitz et al. ................ 715/850 |
| 5,977,974 | A | * | 11/1999 | Hatori et al. .................. 715/839 |
| 6,097,393 | A | * | 8/2000 | Prouty et al. .................. 345/419 |
| 6,236,398 | B1 | * | 5/2001 | Kojima et al. ................ 345/419 |
| 6,266,098 | B1 | * | 7/2001 | Cove et al. .................... 348/563 |

(Continued)

FOREIGN PATENT DOCUMENTS

| | | |
|---|---|---|
| CN | 101595417 A | 12/2009 |
| EP | 2 065 796 A1 | 6/2009 |

(Continued)

OTHER PUBLICATIONS

Lattimore, Disable Option's In A Select (Dropdown) Element, 2005.*

*Primary Examiner* — Devona Faulk
*Assistant Examiner* — Charles L Beard
(74) *Attorney, Agent, or Firm* — Oliff PLC

(57) ABSTRACT

An information processing apparatus includes an operation part and a display part to display an object selection image. The object selection image includes a position designation figure group including N (N is an integer of 3 or more) position designation figures which are arranged in a ring shape and on each of which one object can be arranged. In the object selection image, the display part rotates and moves the position designation figure group, together with the arranged objects, along a circumferential direction of the ring, and causes a specific position designation figure in the position designation figure group to be displayed to enable recognition that the object arranged on the specific position designation figure can be selected by an operation of the operation part.

14 Claims, 9 Drawing Sheets

(56) References Cited

U.S. PATENT DOCUMENTS

| | | | |
|---|---|---|---|
| 6,295,062 B1* | 9/2001 | Tada et al. | 715/835 |
| 6,411,337 B2* | 6/2002 | Cove et al. | 348/563 |
| 6,448,987 B1* | 9/2002 | Easty et al. | 715/834 |
| 6,466,237 B1* | 10/2002 | Miyao et al. | 715/838 |
| 6,544,123 B1* | 4/2003 | Tanaka et al. | 463/36 |
| 6,577,330 B1* | 6/2003 | Tsuda et al. | 715/782 |
| 7,091,998 B2* | 8/2006 | Miller-Smith | 715/810 |
| 7,111,788 B2* | 9/2006 | Reponen | 235/472.01 |
| 7,137,075 B2* | 11/2006 | Hoshino et al. | 715/848 |
| 7,350,158 B2* | 3/2008 | Yamaguchi et al. | 715/834 |
| 7,503,014 B2* | 3/2009 | Tojo et al. | 715/810 |
| 7,669,126 B2* | 2/2010 | Morita et al. | 715/716 |
| 7,685,619 B1* | 3/2010 | Herz | 725/52 |
| 7,797,641 B2* | 9/2010 | Karukka et al. | 715/802 |
| 7,812,824 B2* | 10/2010 | Im et al. | 345/173 |
| 7,966,577 B2* | 6/2011 | Chaudhri et al. | 715/835 |
| 8,028,250 B2* | 9/2011 | Vronay et al. | 715/853 |
| 8,140,996 B2* | 3/2012 | Tomkins | 715/785 |
| 8,140,998 B2* | 3/2012 | Ueda et al. | 715/810 |
| 8,201,096 B2* | 6/2012 | Robert et al. | 715/767 |
| 8,245,156 B2* | 8/2012 | Mouilleseaux et al. | 715/834 |
| 8,281,244 B2* | 10/2012 | Neuman et al. | 715/716 |
| 8,286,096 B2* | 10/2012 | Shibaike | 715/834 |
| 8,296,656 B2* | 10/2012 | Dowdy et al. | 715/727 |
| 8,370,770 B2* | 2/2013 | Vance et al. | 715/834 |
| 8,407,622 B2* | 3/2013 | Rhee et al. | 715/840 |
| 8,429,530 B2* | 4/2013 | Neuman et al. | 715/716 |
| 8,477,108 B2* | 7/2013 | Waller er al. | 345/173 |
| 8,549,432 B2* | 10/2013 | Warner | 715/834 |
| 8,564,543 B2* | 10/2013 | Chaudhri | 345/173 |
| 8,566,722 B2* | 10/2013 | Gordon et al. | 715/721 |
| 8,587,528 B2* | 11/2013 | Chaudhri | 345/173 |
| 8,605,008 B1* | 12/2013 | Prest et al. | 345/8 |
| 8,607,165 B2* | 12/2013 | Lee et al. | 715/835 |
| 8,826,160 B2* | 9/2014 | Sherrard et al. | 715/764 |
| 2001/0028369 A1* | 10/2001 | Gallo et al. | 345/848 |
| 2002/0105549 A1 | 8/2002 | Yokota | |
| 2004/0100479 A1* | 5/2004 | Nakano et al. | 345/700 |
| 2004/0155907 A1* | 8/2004 | Yamaguchi et al. | 345/810 |
| 2004/0250217 A1* | 12/2004 | Tojo et al. | 715/810 |
| 2005/0086611 A1* | 4/2005 | Takabe et al. | 715/823 |
| 2005/0091596 A1* | 4/2005 | Anthony et al. | 715/712 |
| 2005/0206643 A1* | 9/2005 | Endoh et al. | 345/428 |
| 2006/0001645 A1* | 1/2006 | Drucker et al. | 345/156 |
| 2006/0048076 A1* | 3/2006 | Vronay et al. | 715/810 |
| 2006/0212829 A1* | 9/2006 | Yahiro et al. | 715/810 |
| 2006/0250355 A1* | 11/2006 | Miller-Smith | 345/156 |
| 2006/0279541 A1* | 12/2006 | Kim et al. | 345/158 |
| 2007/0011617 A1* | 1/2007 | Akagawa et al. | 715/738 |
| 2007/0070066 A1* | 3/2007 | Bakhash | 345/419 |
| 2007/0162862 A1* | 7/2007 | Ogasawara et al. | 715/751 |
| 2007/0189737 A1* | 8/2007 | Chaudhri et al. | 386/125 |
| 2007/0271528 A1* | 11/2007 | Park et al. | 715/810 |
| 2007/0296646 A1 | 12/2007 | Yamamoto et al. | |
| 2008/0022228 A1* | 1/2008 | Kwon et al. | 715/838 |
| 2008/0066016 A1* | 3/2008 | Dowdy et al. | 715/854 |
| 2008/0122870 A1* | 5/2008 | Brodersen et al. | 345/634 |
| 2008/0189627 A1* | 8/2008 | Nikitin et al. | 715/762 |
| 2008/0295037 A1* | 11/2008 | Cao et al. | 715/852 |
| 2009/0074377 A1* | 3/2009 | Herz | 386/69 |
| 2009/0125801 A1* | 5/2009 | Algreatly | 715/234 |
| 2009/0125842 A1* | 5/2009 | Nakayama | 715/835 |
| 2009/0138823 A1* | 5/2009 | Bradea | 715/835 |
| 2009/0160933 A1* | 6/2009 | Herz | 348/43 |
| 2009/0172596 A1* | 7/2009 | Yamashita | 715/834 |
| 2009/0198359 A1* | 8/2009 | Chaudhri | 700/94 |
| 2010/0037144 A1* | 2/2010 | Vance et al. | 715/739 |
| 2010/0066821 A1* | 3/2010 | Rosener et al. | 348/77 |
| 2010/0144331 A1* | 6/2010 | Koberg et al. | 455/418 |
| 2010/0175026 A1* | 7/2010 | Bortner et al. | 715/818 |
| 2010/0205563 A1* | 8/2010 | Haapsaari et al. | 715/825 |
| 2010/0281430 A1* | 11/2010 | Safar | 715/834 |
| 2010/0287504 A1* | 11/2010 | Vance et al. | 715/811 |
| 2010/0318928 A1* | 12/2010 | Neuman et al. | 715/769 |
| 2010/0333029 A1* | 12/2010 | Smith et al. | 715/834 |
| 2011/0047513 A1* | 2/2011 | Onogi et al. | 715/838 |
| 2011/0061010 A1* | 3/2011 | Wasko | 715/769 |
| 2011/0113384 A1* | 5/2011 | Gotcher et al. | 715/851 |
| 2012/0081356 A1* | 4/2012 | Filippov et al. | 345/419 |
| 2012/0084732 A1* | 4/2012 | Filippov et al. | 715/838 |
| 2013/0014059 A1 | 1/2013 | Nakayama | |
| 2013/0047123 A1* | 2/2013 | May et al. | 715/834 |

FOREIGN PATENT DOCUMENTS

| | | |
|---|---|---|
| JP | A-11-143676 | 5/1999 |
| JP | A-2000-284879 | 10/2000 |
| JP | A-2000-305760 | 11/2000 |
| JP | A-2002-318134 | 10/2002 |
| JP | A-2004-326189 | 11/2004 |
| JP | A-2007-300565 | 11/2007 |
| JP | A-2008-033891 | 2/2008 |
| JP | A-2010-237784 | 10/2010 |
| JP | A-2010-537288 | 12/2010 |
| WO | WO 2008/092230 A1 | 8/2008 |
| WO | WO 2009/024400 A1 | 2/2009 |
| WO | WO 2009/120856 A2 | 10/2009 |

* cited by examiner

INFORMATION PROCESSING APPARATUS, CONTROL METHOD OF INFORMATION PROCESSING APPARATUS, AND TRANSMISSION HEAD-MOUNT TYPE DISPLAY DEVICE

BACKGROUND

1. Technical Field

The present invention relates to an information processing apparatus, a control method of the information processing apparatus, and a transmission head-mount type display device.

2. Related Art

In an information processing apparatus such as a personal computer or a portable information terminal, for example, a menu image in which plural icons are arranged is displayed on a display part, and when one icon is selected by an operation of an operation part such as a mouse or a touch pad, a process (for example, start of an application program) corresponding to the selected icon is performed. Hitherto, an information processing apparatus is known in which a menu image including a ring-shaped figure and plural icons arranged on the ring-shaped figure is displayed, the plural icons are rotated and moved along the ring-shaped figure according to an operation of an operation part, while the arrangement order is maintained, and a selecting operation on an icon arranged at a specific position of the ring-shaped figure is received (for example, see JP-A-2004-326189).

JP-A-11-143676 is another example of related art.

However, in the related art information processing apparatus, since the arrangement mode of the icons, such as the interval between the icons and the sizes of the icons, can change according to the increase or decrease of the number of icons arranged on the ring-shaped figure, the user is liable to feel uncomfortable, and there is room for improvement in user's convenience. Besides, in the related art information processing apparatus, if the number of icons arranged on the ring-shaped figure increases, a desired icon is hard to find. On the other hand, if the number of icons arranged on the ring-shaped figure decreases, it is hard to recognize that the icons are arranged in the ring shape, and it becomes difficult to intuitively perform an operation of rotating and moving an icon group. Also from these points, there is room for improvement in user's convenience.

Incidentally, the problem as stated above is not limited to the image for selecting the icon, and is the problem common to information processing apparatuses to display an object selection image for selecting an object on a display part.

SUMMARY

An object of some aspects of the invention is to improve the user's convenience (usability) of an information processing apparatus.

Application Example 1

This application example of the invention is directed to an information processing apparatus including an operation part, and a display part to display an object selection image for selecting an object. The object selection image includes a position designation figure group including N (N is an integer of 3 or more) position designation figures which are arranged in a ring shape and on each of which one object can be arranged. When the operation part receives a specified rotation instruction operation, in the object selection image, the display part rotates and moves the position designation figure group, together with the object arranged on each of the position designation figures, along a circumferential direction of the ring by a rotation amount corresponding to the rotation instruction operation, and causes a specific position designation figure, which is one of the position designation figures and is positioned at a specific position in the position designation figure group in a stop state of the rotation movement, to be displayed to enable recognition that the object arranged on the specific position designation figure can be selected by an operation of the operation part.

According to this information processing apparatus, since the number N of the position designation figures constituting the position designation figure group displayed in the object selection image does not increase or decrease, the arrangement mode of the position designation figures, such as the interval between the position designation figures and the sizes of the position designation figures, does not change, and the position designation figures in the same arrangement mode are always displayed. Thus, the user hardly feels uncomfortable on the screen structure regardless of the arrangement situations of the object to the position designation figure group. Besides, since the number N of the position designation figures constituting the position designation figure group displayed in the object selection image does not increase or decrease, it does not occur that the number of the position designation figures displayed on one screen is excessively large and the desired object arranged on the position designation figure is hard to find. On the other hand, it does not occur that the number of the position designation figures displayed on one screen is excessively small, and it becomes hard to recognize that the position designation figures are arranged in the ring shape, and it becomes difficult to intuitively perform the operation of rotating and moving the position designation figure group. Besides, also when the design taste of the objects is irregular, the image can be made to have a certain sensation of unity by the existence of the position designation figures. Accordingly, in the information processing apparatus, the user's convenience (usability) can be improved.

Application Example 2

This application example of the invention is directed to the information processing apparatus of Application Example 1, wherein the display part adjusts the rotation amount in the object selection image so that an unarranged position designation figure, which is the position designation figure on which the object is not arranged, does not stop at the specific position and does not become the specific position designation figure.

In this information processing apparatus, the rotation amount is adjusted so that in the object selection image, the unarranged position designation figure on which the object is not arranged does not stop at the specific position and does not become the specific position designation figure. Accordingly, it does not occur that the unarranged position designation figure becomes the specific position designation figure and the rotation instruction operation is again required, and the user's convenience can be further improved.

Application Example 3

This application example of the invention is directed to the information processing apparatus of Application Example 1 or 2, wherein the display part displays the specific position designation figure to be opaque in the object selection image, and displays the position designation figure other than the specific position designation figure to be semi-transparent.

In this information processing apparatus, the selectable specific position designation figure can be displayed to be more noticeable than the other position designation figure, and the presently selected object can be recognized at a glance.

Application Example 4

This application example of the invention is directed to the information processing apparatus of Application Example 3, wherein an imaginary plane including the ring in the object selection image is not parallel to an image plane of the object selection image, and the specific position is a position at a nearest side of the ring-shaped arrangement.

In this information processing apparatus, the selectable specific position designation figure can be displayed to be more noticeable than the other position designation figure, and the presently selected object can be recognized at a glance.

Application Example 5

This application example of the invention is directed to the information processing apparatus of Application Example 4, wherein the display part displays the position designation figure positioned at a nearer side of the ring-shaped arrangement to be larger in the object selection image.

In this information processing apparatus, a three-dimensional representation of the position designation figure group can be emphasized.

Application Example 6

This application example of the invention is directed to the information processing apparatus of Application Example 4 or 5, wherein the display part displays a contour of at least one position designation figure in the object selection image to be more blurred than the position designation figure positioned at a nearer side of the ring-shaped arrangement.

In this information processing apparatus, a three-dimensional representation of the position designation figure group can be emphasized.

Application Example 7

This application example of the invention is directed to the information processing apparatus of any of Application Examples 4 to 6, wherein an inclination of the imaginary plane with respect to the image plane of the object selection image in the object selection image is set at such an angle that at least a portion of at least one position designation figure positioned at a far side of the ring-shaped arrangement overlaps with the position designation figure positioned at a near side.

In this information processing apparatus, the specific position designation figure can be emphasized without impairing the three-dimensional representation.

Application Example 8

This application example of the invention is directed to the information processing apparatus of any of Application Examples 1 to 7, wherein the display part sets a plurality of the position designation figure groups, and when the operation part receives a specified change-over instruction operation, the display part changes the position designation figure group to be displayed in the object selection image to the other position designation figure group.

In this information processing apparatus, while the number of the position designation figures to be display on one screen is fixed, the arrangement and selection of the objects the number of which exceeds N can be performed.

Application Example 9

This application example of the invention is directed to the information processing apparatus of Application Example 8, wherein the display part sets an order to each of the plurality of the position designation figure groups, and each time the operation part receives a specified sequential change-over instruction operation, in the object selection image, the display part changes the position designation figure group to be displayed in accordance with the order.

In this information processing apparatus, the change-over of the position designation figure group to be displayed can be easily performed.

Application Example 10

This application example of the invention is directed to the information processing apparatus of Application Example 8 or 9, wherein when display of the position designation figure group is changed, if the position designation figure in which an object is not arranged is positioned at the specific position in the position designation figure group to be newly displayed, the display part rotates and moves the position designation figure group along the peripheral direction of the ring so that the position designation figure in which the object is arranged is positioned at the specific position.

In this information processing apparatus, after the display of the position designation figure group is changed, it does not occur that the unarranged position designation figure becomes the specific position designation figure and the rotation instruction operation is again required, and the user's convenience can be further improved.

Application Example 11

This application example of the invention is directed to the information processing apparatus of any of Application Examples 1 to 10, wherein when the operation part receives a specified mode change-over instruction operation, the display part displays an object arrangement image which is an image for arranging an object on the position designation figure and includes an arrangement position designation figure group corresponding to the position designation figure group in the object selection image. When the operation part receives a specified rotation instruction operation, in the object arrangement image, the display part rotates and moves the arrangement position designation figure group, together with the object arranged on each of the position designation figures, along the circumferential direction of the ring by a rotation amount corresponding to the rotation instruction operation, and causes the specific position designation figure in the arrangement position designation figure group to be displayed to enable recognition that the object can be arranged by the operation of the operation part.

In this information processing apparatus, also in the object arrangement image, since the number N of the position designation figures constituting the arrangement position designation figure group does not increase or decrease, the user's convenience (usability) at the time when the object is arranged on the position designation figure can be improved.

Application Example 12

This application example of the invention is directed to the information processing apparatus of Application Example 11, wherein an imaginary plane including the ring in the object arrangement image is not parallel to an image plane of the object selection image, and an inclination of the imaginary plane in the object arrangement image with respect to the image plane of the object arrangement image is different from an inclination of the imaginary plane in the object selection image with respect to the image plane of the object selection image.

In this information processing apparatus, since the inclination of the imaginary plane including the ring in the object arrangement image is different from the inclination in the object selection image, when display is changed between similar images, for example, when the object selection image is changed to the object arrangement image including the arrangement position designation figure group corresponding to the position designation figure group in the object selection image, the user can be made to clearly recognize that the image is changed.

Application Example 13

This application example of the invention is directed to the information processing apparatus of Application Example 12, wherein the display part displays the specific position designation figure to be opaque, and displays the position designation figure other than the specific position designation figure to be semi-transparent in the object arrangement image. The inclination of the imaginary plane in the object arrangement image with respect to the image plane of the object arrangement image is set to such an angle that at least a portion of each of all the position designation figures does not overlap with the other position designation figure.

In this information processing apparatus, even if the arrangement position designation figure group is not rotated or moved, it is possible to grasp at a glance that the object is arranged on which of the position designation figures constituting the arrangement position designation figure group, and the object is not arranged on which one, and the user's convenience at the time when the object is arranged on the position designation figure can be further improved.

Application Example 14

This application example of the invention is directed to a transmission head-mount type display device including an image display part that includes an image light generation part to generate an image light representing an image, and a light guide part to guide the generated image light to eyes of a user, and causes the user to visually recognize a virtual image in a state where the device is mounted on a head of the user, and an operation part. The image display part displays an object selection image including a position designation figure group including N (N is an integer of 3 or more) position designation figures which are arranged in a ring shape and on each of which one object can be arranged. When the operation part receives a specified rotation instruction operation, in the object selection image, the image display part rotates and moves the position designation figure group, together with the object arranged on each of the position designation figures, along a circumferential direction of the ring by a rotation amount corresponding to the rotation instruction operation, and causes a specific position designation figure, which is one of the position designation figures and is positioned at a specific position in the position designation figure group in a stop state of the rotation movement, to be displayed to enable recognition that the object arranged on the specific position designation figure can be selected by an operation of the operation part.

According to this transmission head-mount type display device, since the number N of the position designation figures constituting the position designation figure group displayed in the object selection image does not increase or decrease, the arrangement mode of the position designation figures, such as the interval between the position designation figures and the sizes of the position designation figures, does not change, and the position designation figures in the same arrangement mode are always displayed. Thus, the user hardly feels uncomfortable on the screen structure regardless of the arrangement situation of the object to the position designation figure group. Besides, since the number N of the position designation figures constituting the position designation figure group displayed in the object selection image does not increase or decrease, it does not occur that the number of the position designation figures displayed on one screen is excessively large and the desired object arranged on the position designation figure is hard to find. On the other hand, it does not occur that the number of the position designation figures displayed on one screen is excessively small, and it becomes hard to recognize that the position designation figures are arranged in the ring shape, and it becomes difficult to intuitively perform the operation of rotating and moving the position designation figure group. Besides, also when the design taste of the objects is irregular, the image can be made to have a certain sensation of unity by the existence of the position designation figures. Further, since the head-mount type display device is of the transmission type, the user can obtain such a visual experience that the position designation figure group floats in front of the eyes. Accordingly, in the transmission head-mount type display device, the user's convenience (usability) can be improved.

Incidentally, the invention can be implemented in various modes, and can be realized in the form of, for example, an information processing apparatus, a control device and a control method of the information processing apparatus, a display device, a control device and a control method of the display device, a transmission head-mount type display device, a control device and a control method of the transmission head-mount type display device, an information processing system, a transmission head-mount type display system, a computer program to realize these methods, devices or functions of the systems, a recording medium recording the computer program, a data signal including the computer program and realized in a carrier wave, and the like.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, embodiments of the invention will be described in the following order.
A. Embodiment:
A-1. Apparatus structure:
A-2. Display image:
   A-2-1. Display image in icon selection mode:
   A-2-2. Display image in icon arrangement mode:
B. Modified example:

A. Embodiment

A-1. Apparatus Structure

Figure 1:
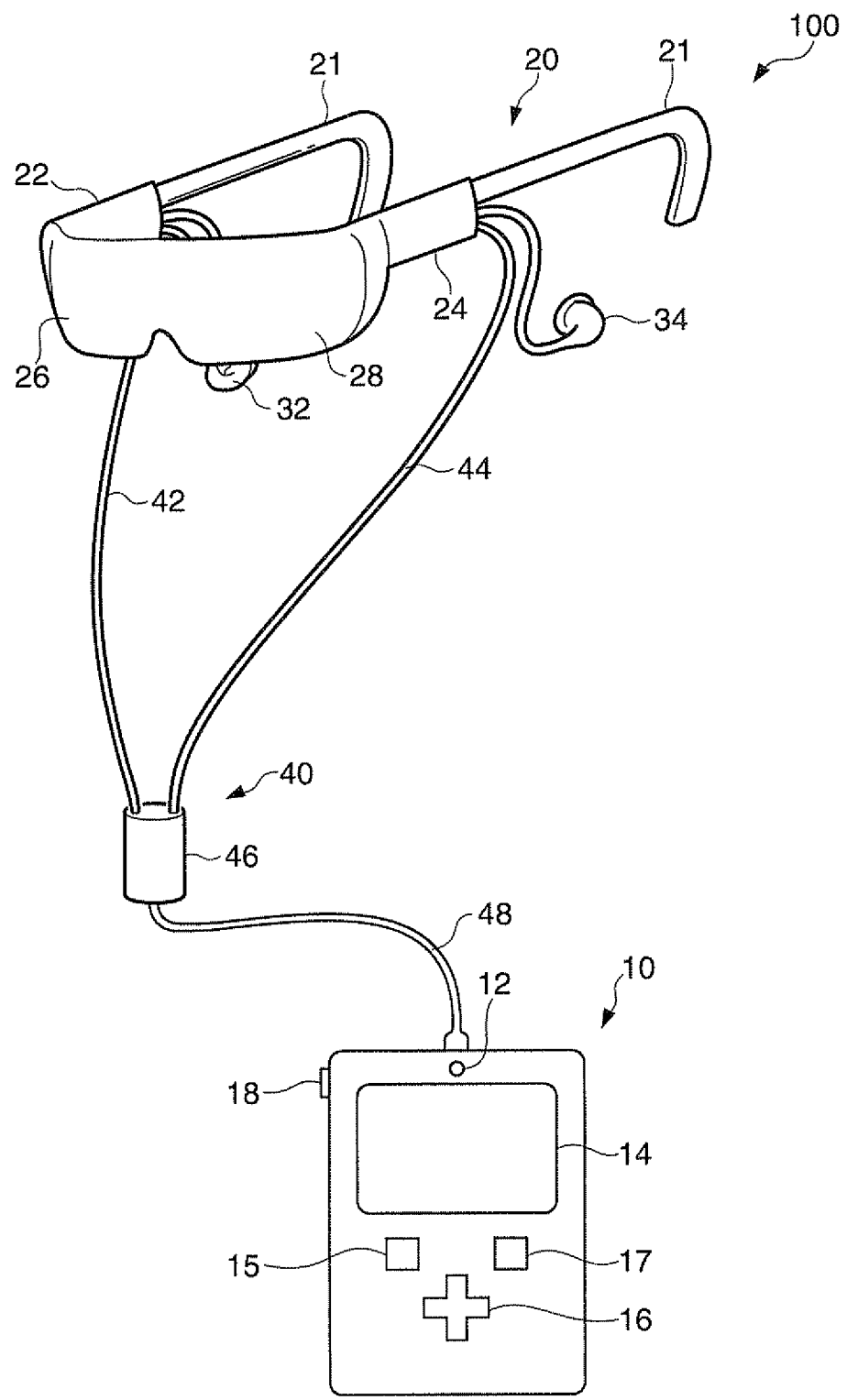
FIG. 1 is an explanatory view showing an outer appearance structure of a head-mount type display device as an information processing apparatus in an embodiment of the invention.

FIG. 1 is an explanatory view showing an outer appearance structure of a head-mount type display device 100 as an information processing apparatus in an embodiment of the invention. The head-mount type display device 100 is a display device mounted on a head, and is also called a head mounted display (HMD). The head-mount type display device 100 of the embodiment is a transmission head-mount type display device in which the user visually recognizes a virtual image and can directly visually recognize the external scene at the same time.

The head-mount type display device 100 includes an image display part that causes the user to visually recognize a virtual image in a state where the device is mounted on the head of the user, and a control part (controller) 10 to control the image display part 20.

The image display part 20 is a mounted body mounted on the head of the user, and has a shape like a pair of glasses in this embodiment. The image display part 20 includes an ear hooking part 21 functioning as a temple, and a right optical panel 26 and a left optical panel 28 respectively positioned in front of the right and left eyes of the user in the sate where the user mounts the image display part 20. A right display drive part 22 is arranged at a connection portion between the ear hooking part 21 for the right ear and the right optical panel 26, and a left display drive part 24 is arranged at a connection portion between the ear hooking part 21 for the left ear and the left optical panel 28. In the following description, the right display drive part 22 and the left display drive part 24 are collectively simply called also the "display drive part", and the right optical panel 26 and the left optical panel 28 are collectively simply called also the "optical panel".

The image display part 20 includes a right earphone 32 for the right ear and a left earphone 34 for the left ear. The right earphone 32 and the left earphone 34 are respectively mounted on the right and the left ears when the user mounts the image display part 20.

The image display part 20 further includes a connection part 40 for connecting the image display part 20 to the control part 10. The connection part 40 includes a main cable 48 connected to the control part 10, a right cable 42 and a left cable 44 which branch from the main cable 48, and a coupling part 46 provided at the branching point. The right cable 42 is connected to the right display drive part 22, and the left cable 44 is connected to the left display drive part 24. The image display part 20 and the control part 10 transmit various signals through the connection part 40. Connectors (not shown) fitted to each other are respectively provided at the end of the main cable 48 on the opposite side to the coupling part 46 and at the control part 10. The control part 10 and the image display part 20 are connected to and are separated from each other by fitting/release of fitting of the connector of the main cable 48 and the connector of the control part 10.

The control part 10 is a device to control the image display of the image display part 20. The control part 10 includes a power supply switch 18 to switch ON/OFF of a power supply, a lighting part 12 to notify the operation state (for example, the ON/OFF state of the power supply) of the head-mount type display device 100 by the light emission state, a touch pad 14 to detect a finger operation of the user and to output a signal corresponding to the finger operation, a cross key 16 to detect depressing operations of keys corresponding to up, down, right and left directions and to output signals corresponding to the operations, a determination key 15 to detect a depressing operation of the key and to output a signal corresponding to the operation, and a back key 17 to detect a depressing operation of the key and to output a signal corresponding to the operation. As the lighting part 12, for example, one or plural LED lamps can be used. The touch pad 14 is a capacitance-type touch pad, and can receive a pointing (position designation) operation, a click operation, a drag operation and a flick operation. Incidentally, the flick operation is an operation in which the touch pad 14 is turned on by the contact with the operation surface or the depression of a switch, the contact position of the finger on the operation surface is moved, and the finger is separated from the operation surface at a position different from one located when the touch pad is turned on, and is an operation in which the speed of change of the contact position of the finger is a specified threshold or more.

Figure 2:
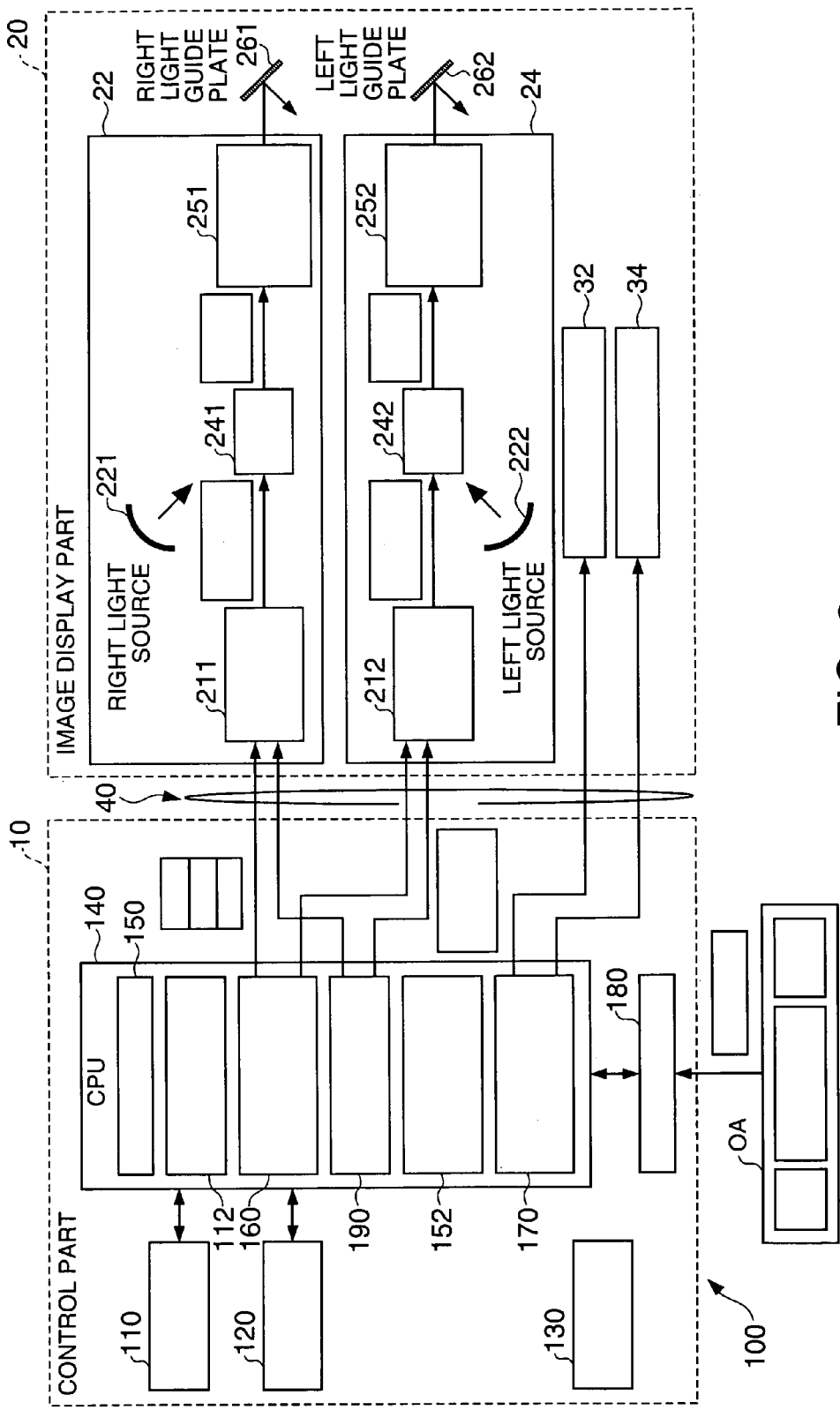
FIG. 2 is an explanatory view functionally showing a structure of the head-mount type display device.

FIG. 2 is an explanatory view functionally showing a structure of the head-mount type display device 100. As shown in FIG. 2, the control part 10 includes a CPU 140, a storage part 120 including ROM, RAM or the like, a power supply 130 to supply power to respective parts of the head-mount type display device 100, an operation part 110 (including, in this embodiment, the touch pad 14, the determination key 15, the cross key 16, the back key 17, and the power supply switch 18) operated by the user, and an interface 180 for connecting various external equipments OA (for example, a personal computer PC, a portable telephone terminal, a game terminal, etc.) as a supply source of content data such as an image (still image, moving image), sound and the like. As the power supply 130, for example, a secondary battery can be used. As the interface 180, for example, a USB interface, an interface for a memory card, a wireless LAN interface or the like can be adopted.

The storage part 120 stores various computer programs, and the CPU 140 reads the computer programs from the storage part 120 and executes them, so that the CPU 140 functions as an operating system (OS) 150, an operation control part 112, an image processing part 160, a display control part 190, an icon management part 152 and a sound processing part 170.

The operation control part 112 receives a signal outputted from the operation part 110 in accordance with the operation of the user in the operation part 110, and causes the display control part 190, the image processing part 160, the icon management part 152 or the like to perform the operation corresponding to the signal. The operation part 110 and the operation control part 112 correspond to the operation part in the invention.

Based on content data inputted through the interface 180 or stored in the storage part 120, the image processing part 160 generates a vertical synchronization signal VSync, a horizontal synchronization signal HSync, and image data Data, and supplies these signals to the image display part 20 through the connection part 40. Specifically, the image processing part 160 acquires an image signal (for example, an analog signal including 30 frame images per second) included in the content data, separates the synchronization signal, such as the vertical synchronization signal VSync and the horizontal synchronization signal HSync, from the acquired image signal, converts the analog image signal from which the synchronization signal is separated into a digital image signal and generates the image data Data. Incidentally, the image processing part 160 may execute a resolution conversion process, a color correction process, or the like on the image data as the need arises.

The display control part 190 generates control signals to control the right display drive part 22 and the left display drive part 24, and controls the image display state in the image display part 20 by supplying the signals to the image display part 20 through the connection part 40. Specifically, the display control part 190 individually controls driving ON/OFF of a right LCD 241 by a right LCD control part 211, driving ON/OFF of a right light source 221 by a right light source control part, driving ON/OFF of a left LCD 242 by a left LCD control part 212, and driving ON/OFF of a left light source 222 by a left light source control part, and controls whether or not image lights are generated by the right display drive part 22 and the left display drive part 24. For example, the display part 190 causes both the right display drive part 22 and the left display drive part 24 to generate the image lights, causes only one of them to generate the image light, or causes both of them not to generate the image lights.

The icon management part 152 is an application program that controls the image processing part 160 or the display control part 190 in an icon selection mode or an icon arrangement mode of the head-mount type display device 100 described later, and causes the image display part 20 to display an image (described later) for icon selection or arrangement or causes the OS 150 to execute a process corresponding to a selected icon.

The sound processing part 170 acquires a sound signal included in the content data, amplifies the acquired sound signal, and supplies the signal to the right earphone 32 and the left earphone 34 of the image display part 20 through the connection part 40.

The right display drive part 22 of the image display part 20 includes the right light source 221 composed of, for example, an LED lamp, the right light source control part to drive the right light source 221 based on the control signal supplied from the control part 10, the right liquid crystal display (LCD) 241 to modulate the illumination light irradiated from the right light source 221 into the image light representing an image, and the right LCD control part 211 to drive and control the right LCD 241 based on the vertical synchronization signal VSync, the horizontal synchronization signal HSync, and the image data Data supplied from the control part 10. The right LCD 241 includes, for example, a transmission liquid crystal panel. The right light source 221, the right light source control part, the right LCD 241 and the right LCD control part 211 correspond to the image light generation part in the invention. The right display drive part 22 further includes a right projection optical system 251 to project the generated image light. The right projection optical system 251 includes, for example, a collimate lens.

The right optical panel 26 (FIG. 1) of the image display part 20 includes a right light guide plate 261, and the right light guide plate 261 reflects the image light outputted from the right projection optical system 251 along a specified light path and guides the light to the right eye of the user. Incidentally, the right projection optical system 251 and the right light guide plate 261 correspond to the light guide part in the invention.

Similarly to the right display drive part 22, the left display drive part 24 includes the left light source 222, the left light source control part, the left LCD 242, the left LCD control part 212, and a left projection optical system 252. Since the structures and functions of the respective components included in the left display drive part 24 are the same as those of the respective components included in the right display drive part 22, their description is omitted here. Besides, the left optical panel 28 of the image display part 20 includes a left light guide plate 262, and the left light guide plate 262 reflects the image light outputted from the left projection optical system 252 along a specified light source and guides the light to the left eye of the user. The left light source 222, the left light source control part, the left LCD 242 and the left LCD control part 212 correspond to the image light generation part in the invention. The left projection optical system 252 and the left light guide plate 262 correspond to the light guide part in the invention.

The image lights guided to both the eyes of the user of the head-mount type display device 100 in this way form images on retinas, and the user visually recognizes a virtual image. Incidentally, in the specification, displaying an image includes that the head-mount type display device 100 causes the user to visually recognize a virtual image. The image processing part 160, the display control part 190, the icon management part 152, and the image display part 20 correspond to the display part in the invention.

Figure 3:
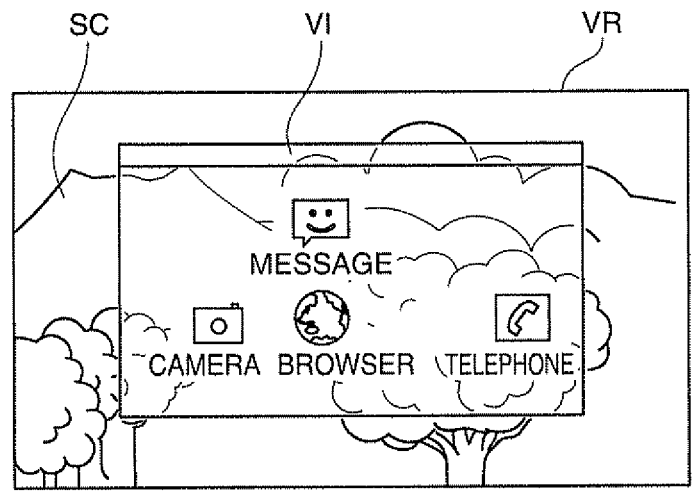
FIG. 3 is an explanatory view showing an example of a virtual image recognized by a user.

FIG. 3 is an explanatory view showing an example of the virtual image recognized by the user. As shown in FIG. 3, the virtual image V1 is displayed in the visual field VR of the user of the head-mount type display device 100. Besides, in a portion of the visual field VR of the user, other than a portion where the virtual image V1 is displayed, the user can see an external scene SC through the right optical panel 26 and the left optical panel 28. Incidentally, in the head-mount type display device 100 of this embodiment, also in the portion where the virtual image VI is displayed in the visual field VR of the user, the external scene SC can be seen through the virtual image VI.

Incidentally, the right optical panel 26 and the left optical panel 28 may include light adjusting plates that are provided on the front sides (sides opposite to the sides of the eyes of the user) of the right light guide plate 261 and the left light guide plate 262, and can adjust the light transmittance. When the light adjusting plates are provided, the amount of external light entering the eyes of the user is adjusted by adjusting the light transmittance of the light adjusting plates, and the easiness of visual recognition of the virtual image can be adjusted.

A-2. Display Image

A-2-1. Display Image in Icon Selection Mode

Figure 4:
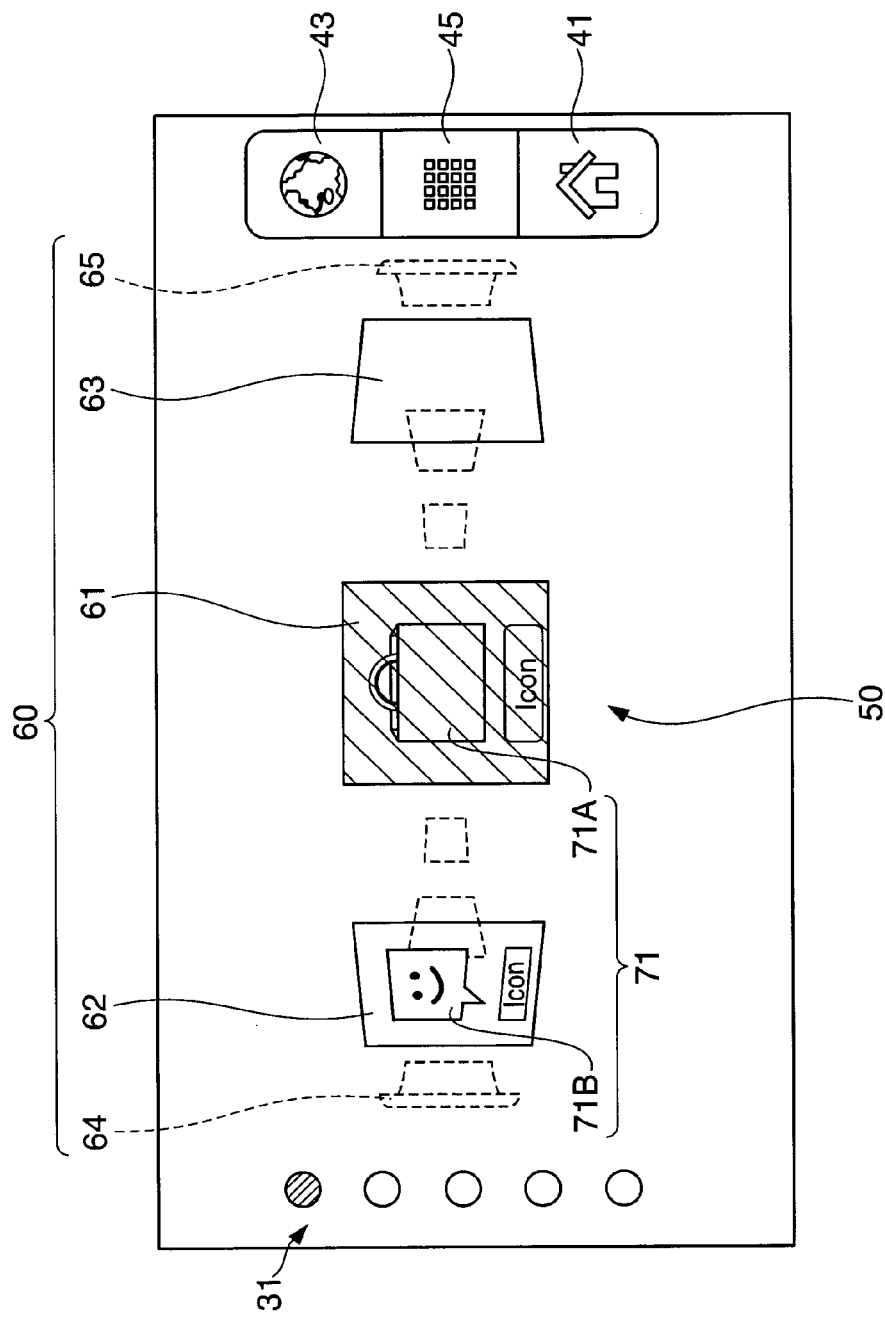
FIG. 4 is an explanatory view showing an example of an icon selection image ISI displayed in an icon selection mode.

Next, a description will be made on an image (the virtual image VI recognized in the visual field VR of the user, see FIG. 3) displayed by the head-mount type display device 100 in an icon selection mode. FIG. 4 is an explanatory view showing an example of an icon selection image ISI displayed in the icon selection mode. The icon selection mode is a mode in which an icon as an object is selected in order to perform a process corresponding to the icon (for example, start of an application program corresponding to the icon). When the user performs a specified operation through the operation part 110, the head-mount type display device 100 is placed in the icon selection mode. The image display process in the icon selection mode is performed mainly under the control of the display control part 190, the image processing part 160, and the icon management part 152 and by the image display part 20. Incidentally, the icon selection image ISI corresponds to the object selection image in the invention.

As shown in FIG. 4, the icon selection image ISI includes a position designation figure group 50 including N (N is an integer of 3 or more) position designation figures 60. The respective position designation figure 60 constituting the position designation figure group 50 are card-like figures, and are spaced from each other and arranged in a ring shape. The number N of the position designation figure 60 constituting the position designation figure group 50 displayed in the icon selection image ISI is a fixed value, and is 16 in this embodiment. Incidentally, the icon selection image ISI does not include an image (line image) of a ring-shaped figure, and is such an image that the N position designation figure 60 are arranged in the ring shape so that the user is conscious of the ring shape.

As shown in FIG. 4, in the icon selection image ISI, the ring formed by the arrangement of the respective position designation figure 60 constituting the position designation figure group 50 is not parallel to the image plane of the icon selection image ISI, and has a specified inclination. Here, that the ring is not parallel to the image plane of the icon selection image ISI and has the specified inclination means that the imaginary plane including therein the ring is not parallel to the image plane of the icon selection image ISI. Besides, the image plane of the icon selection image ISI means the imaginary plane including therein the virtual image VI visually recognized by the user. That is, the ring is not a two-dimensionally expressed ring parallel to the image plane of the icon selection image ISI, but a three-dimensionally expressed ring non-parallel to the image plane of the icon selection image ISI. In this embodiment, the inclination of the ring is at substantially right angles to the image plane of the icon selection image ISI. Thus, in this embodiment, at least a portion of at least one position designation figure 60 positioned at the far side of the rang-shaped arrangement overlaps with the position designation figure 60 positioned at the near side.

In the icon selection image ISI, in the respective position designation figure 60, the position designation figure 60 positioned at a nearer side of the ring-shaped arrangement of the position designation figure group 50 is displayed to be larger. By this, the ring-shaped arrangement of the position designation figure group 50 is more three-dimensionally represented. Besides, the contour of at least one of the position designation figure 60 constituting the position designation figure group 50 is display to be more blurred than the position designation figure 60 positioned at a nearer side of the ring-shaped arrangement of the position designation figure group 50. Specifically, in the position designation figure 60 shown in FIG. 4, the position designation figure 60 whose contour is represented by a broken line is displayed such that its contour is blurred, and the position designation figure 60 whose contour is represented by a solid line is displayed such that its contour is clear. By this, the three-dimensional representation of the ring-shaped arrangement of the position designation figure group 50 is further emphasized. Incidentally, in this embodiment, the shape itself of each of the position designation figure 60 is also three-dimensionally represented. For example, the shape of the position designation figure 60 (62) positioned to the immediate left of the position designation figure 60 positioned at the center has a substantially trapezoidal shape whose height gradually decreases from right to left. That is, each of the position designation figure 60 is represented by using the rules of perspective. By this, the three-dimensional representation is further emphasized.

One icon 71 can be arranged on each of the position designation figure 60 constituting the position designation figure group 50. For example, in the example shown in FIG. 4, the one icon 71A is arranged on the position designation figure 60 (61) positioned at the center, and the one icon 71B is arranged on the position designation figue 60 (62) positioned to the immediate left thereof. On the other hand, for example, the icon 71 is not arranged on the position designation figure 60 (63) positioned to the immediate right of the position designation figure 60 (61) positioned at the center. Incidentally, a method of arranging the icon 71 in the position designation figure 60 will be described later.

In the icon selection image ISI, one position designation figure 60 positioned at a specific position of the position designation figure group 50 is a specific position designation figure 61, and the icon 71A arranged on the specific position designation figure 61 can be selected by the operation of the operation part 110. In this embodiment, the position designation fkigure 60 positioned at the nearest side of the ring-shaped arrangement of the position designation figure group 50 (that is, the position designation figure 60 positioned at the center of the icon selection image ISI) is the specific position designation figure 61. Accordingly, the specific position designation figure 61 is the position designation figure 60 displayed to be largest among the position designation figure 60 constituting the position designation figure group 50.

In the icon selection image ISI, the specific position designation figure 61 is displayed to be opaque. For example, the specific position designation figure 61 is displayed to be solidly shaded with a specific color. In FIG. 4, the opaque display of the specific position designation figure 61 is represented by hatching. On the other hand, the position designation fkigure 60 other than the specific position designation figure 61 is displayed to be semi-transparent (that is, another object and an external scene positioned behind the position designation figure 60 is displayed to be visually recognized therethrough). In FIG. 4, the semi-transparent display of the position designation figure 60 is shown to be outlined. By this, the user can identify the specific position designation figure 61, which can be selected by the operation of the operation part 10, among the N position designation figure 60 constituting the position designation figure group 50. Besides, in the ring-shaped arrangement of the position designation figure 60, an overlapping portion of another position designation figure 60, which overlaps with the specific position designation figure 61 and is positioned at the far side, can not be visually recognized. On the other hand, another position designation figure 60, which overlaps with the position designation figure 60 other than the specific position designation figure 61 and is positioned at the far side, is visually recognized through the position designation figure 60 on the near side. Thus, the ring-shaped arrangement of the position designation figure group 50 can be easily visually recognized by the user. Incidentally, in the initial state in which no icon 71 is arranged in the position designation figure group 50, the specific position designation figure 61 is also displayed to be semi-transparent similarly to the other position designation fkigure 60.

In this embodiment, the background portion of the icon selection image ISI, that is, a portion other than the position designation figure group 50, an after-mentioned indicator 31, a home button 41, a list button 45 and a browser button 43 is a black image. Accordingly, in the user's visual field VR (see FIG. 3), and in the background portion of the icon selection image ISI as the virtual image VI, the external scene SC behind can be completely transparently seen. Thus, the user can obtain such a visual experience that the position designation figure group 50 floats in front of the eyes. Besides, in the icon selection image ISI, since the specific position designation figure 61 is displayed to be opaque, the user gets an impression that the specific position designation figure 61 protrudes toward the user.

When the operation part 110 receives a specified rotation instruction operation, in the icon selection image ISI, the N position designation figure 60 constituting the position designation figure group 50 rotates and moves along the circumferential direction of the ring by the rotation amount corresponding to the rotation instruction operation while the arrangement order is maintained. At this time, the icon 71 arranged on each of the position designation figure 60, together with the position designation figure 60, rotates and moves. Incidentally, in this embodiment, the rotation movement of the position designation figure group 50 is represented by animation.

For example, when the left key of the cross key 16 (FIG. 1) is once depressed, the whole of the position designation figure group 50 rotates and moves (counterclockwise when viewed from above), and stops in a state where the position designation figure 60 (62) positioned to the immediate left of the specific position designation figure 61 before the rotation movement becomes the new specific position designation figure 61. That is, the one depression of the left key corresponds to the rotation amount in which each of the position designation figure 60 moves to the position of the adjacent position designation figure 60. Incidentally, at this time, if the icon 71B is not arranged on the position designation figure 60 (62) positioned to the immediate left of the specific position designation figure 61 before the rotation movement, the position designation figure 60 does not become the specific position designation figure 61, and the rotation movement continues until a state in which the position designation figure 60 where the icon 71 is arranged next in the rotation direction becomes the specific position designation figure 61, and stops. That is, in this case, the rotation amount is adjusted so that the position designation figure 60 where the icon 71 is not arranged does not become the specific position designation figure 61. At the time of stop of the rotation movement of the position designation figure group 50, the new specific position designation figure 61 is displayed to be opaque, and the icon 71A arranged on the new specific position designation figure 61 becomes the icon which can be selected by the operation of the operation part 110. On the other hand, the position designation figure 60, which was the specific position designation figure 61 before the rotation movement, is displayed to be semi-transparent after the movement, and is placed in a state where the icon 71 can not be selected.

On the other hand, when the right key of the cross key 16 is once depressed, the whole of the position designation figure group 50 rotates and moves (clockwise when viewed from above), and stops in a state where the position designation figure 60 (62) positioned to the immediate right of the specific position designation figure 61 before the rotation movement becomes the new specific position designation figure 61. That is, the one depression of the right key corresponds to the rotation amount in which each of the position designation figure 60 moves to the position of the adjacent position designation figure 60. Incidentally, the adjustment of the rotation amount, the change of opaque/semi-transparent display at the time of stop of the rotation movement, and the like are the same as the above.

Incidentally, the operation of continuously maintaining the depressed state of the left key or the right key of the cross key 16 is interpreted as plural continuous depressing operations of the left key or the right key. Accordingly, for example, if the depressed state of the left key of the cross key 16 is continued, such an operation that the whole of the position designation figure group 50 rotates and moves counterclockwise, stops for a moment in a state where the position designation figure 60 (62) positioned to the immediate left of the specific position designation figure 61 before the rotation movement becomes the new specific position designation figure 61, and then further rotates and moves in the same direction, is repeated until the depressed state of the left key is released.

In the icon selection mode, when the determination key 15 is depressed, the head-mount type display device 100 executes the process corresponding to the icon 71A arranged on the specific position designation figure 61 (for example, start of an application program corresponding to the icon 71A). Besides, when the back key 17 is depressed (or the depressed state of the back key 17 is continued for a specified time), the icon 71A arranged on the specific position designation figure 61 is deleted, and the specific position designation figure 61 is placed in the unarranged state of the icon 71.

In the head-mount type display device 100 of this embodiment, five position designation figure groups 50 are set, and the order of No. 1 to No. 5 is set for the respective position designation figure groups 50. That is, the five position designation figure groups 50 have the so-called hierarchical structure. In the icon selection mode, one of the five position designation figure groups 50 is displayed in the icon selection image ISI, and when a specified change-over instruction operation is received through the operation part 110, the position designation figure group 50 to be displayed is changed over in accordance with the set order.

Figure 5:
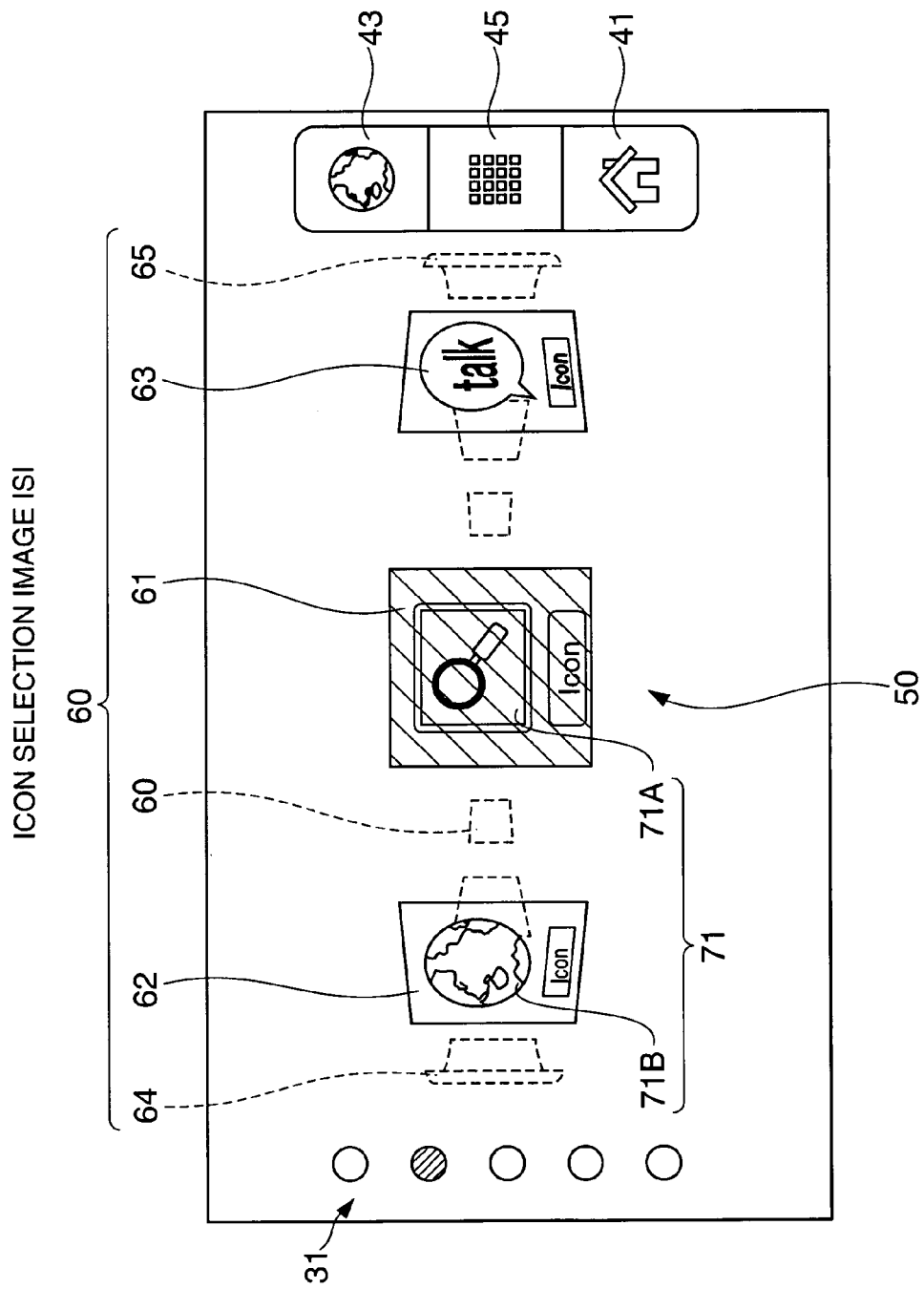
FIG. 5 is an explanatory view showing an example of the icon selection image ISI in which a second position designation figure group is displayed.

For example, as shown in FIG. 4, when the lower key of the cross key 16 (FIG. 1) is once depressed in the state where the first position designation figure group 50 is displayed in the icon selection image ISI, the displayed first position designation figure group 50 becomes non-displayed, and the second position designation figure group 50 is newly displayed. FIG. 5 is an explanatory view showing an example of the icon selection image ISI in which the second position designation figure group 50 is displayed. As shown in FIG. 5, the second position designation figure group 50 different from the first position designation figure group 50 shown in FIG. 4 is displayed in the icon selection image ISI after the display is changed over. Besides, when the upper key of the cross key 16 is once depressed in the state where the second position designation figure group 50 is displayed in the icon selection image ISI, the displayed second position designation figure group 50 becomes non-displayed, and the first position designation figure group 50 is newly displayed.

In this embodiment, when the position designation figure group 50 displayed in the icon selection image ISI is changed over, a scroll expression in an up-and-down direction is performed. That is, for example, when the display is changed from the first position designation figure group 50 to the second position designation figure group 50, an animation expression in which the first position designation figure group 50 moves upward and disappears from the screen, and an animation expression in which the second position designation figure group 50 appears from the lower side of the screen and moves to the center display position are performed.

As shown in FIG. 4 and FIG. 5, the icon selection image ISI includes an indicator 31 to identify the position designation figure group 50 under display. The indicator 31 of the embodiment includes five marks corresponding to the five position designation figure groups 50. In the icon selection image ISI shown in FIG. 4, the display of the uppermost mark of the indicator 31 is different from the other marks. This indicates that the position designation figure group 50 under display is the first one. In the icon selection image ISI of FIG. 5 which is displayed when the lower key of the cross key 16 is once depressed, the display of the second mark from above in the indicator 31 is different from the other marks. This indicates that the position designation figure group 50 under display is the second one. As stated above, in the icon selection image ISI, by using the indicator 31, it is possible to easily recognize that the presently displayed position designation figure group 50 is what number.

When the display of the position designation figure group 50 is changed over, if the icon 71A is not arranged in the specific position designation figure 61 in the newly displayed position designation figure group 50, the position designation figure group 50 rotates and moves along the circumferential direction of the ring, so that the position designation figure 60 in which the icon 71 is arranged becomes the specific position designation figure 61. However, if the position designation figure 60 in which the icon 71 is arranged does not exist in the newly displayed position designation figure group 50, the rotation movement as stated above is not performed.

Incidentally, the operation in the icon selection mode can be performed also by the touch pad 14. For example, when the position of the specific position designation figure 61 of the icon selection image ISI (FIG. 4) is designated through the touch pad 14 and a click operation is performed, similarly to the time of depression of the determination key 15, a process corresponding to the icon 71A arranged in the specific position designation figure 61 (for example, start of an application program corresponding to the icon 7471A) is performed. Besides, in the icon selection image ISI, when the position designation figure 60 (62) positioned to the immediate left of the specific position designation figure 61 is designated and the click operation is performed, similarly to the time of depression of the left key of the cross key 16, the whole of the position designation figure group 50 rotates and moves (counterclockwise when viewed from above), and stops in the state where the position designation figure 60 (62) positioned to the immediate left of the specific position designation figure 61 before the rotation movement becomes the new specific position designation figure 61. Similarly, in the icon selection image ISI, the position designation figure 60 (64) positioned to the immediate left of the position designation figure which is positioned to the immediate left of the specific position designation figure 61, the position designation figure 60 (63) positioned to the immediate right of the specific position designation figure 61, or the position designation figure 60 (65) positioned to the immediate right of the position designation figure which is positioned to the immediate right of the specific position designation figure 60 (63) is designated and the click operation is performed, the whole of the position designation figure group 50 rotates and moves, and stops in the state where the position designation figure 60 designated by the click operation becomes the specific position designation figure 61. Incidentally, the adjustment of the rotation amount, the change of opaque/semi-transparent display at the time of stop of the rotation movement, and the like are the same as the above.

Besides, in the icon selection image ISI, when one mark of the indicator 31 is designated through the touch pad 14 and the click operation is performed, display change-over is performed so that the position designation figure group 50 corresponding to the designated mark is displayed. For example, when the fifth mark from above in the indicator 31 is designated and the click operation is performed, the fifth position designation figure group 50 is displayed in the icon selection image ISI.

Besides, when a rightward flick operation is performed in the touch pad 14, similarly to the time when the left key of the cross key 16 is depressed, the whole of the position designation figure group 50 rotates and moves (counterclockwise when viewed from above). When a leftward flick operation is performed, similarly to the time when the right key of the cross key 16 is depressed, the whole of the position designation figure group 50 rotates and moves (clockwise when viewed from above). Incidentally, the rotation amount at this time is determined according to the speed of change of the contact position of the finger in the flick operation.

Besides, when a downward flick operation is performed in the touch pad 14, similarly to the time when the lower key of the cross key 16 is depressed, the position designation figure group 50 displayed in the icon selection image ISI is changed to the subsequent position designation figure group 50. When an upward click operation is performed, similarly to the time when the upper key of the cross key 16 is depressed, the position designation figure group 50 displayed in the icon selection image ISI is changed to the previous position designation figure group 50.

Incidentally, the icon selection image ISI includes a home button 41, a list button 45 and a browser button 43. When the home button 41 is designated through the touch pad 14 and the click operation is performed, the head-mount type display device 100 changes the display image to a standard home application image (not shown). When the browser button 43 is designated and the click operation is performed, the head-mount type display device 100 starts a web browser. When the list button 45 is designated and the click operation is performed, the head-mount type display device 100 changes the display image to an icon list image IAI.

Figure 6:
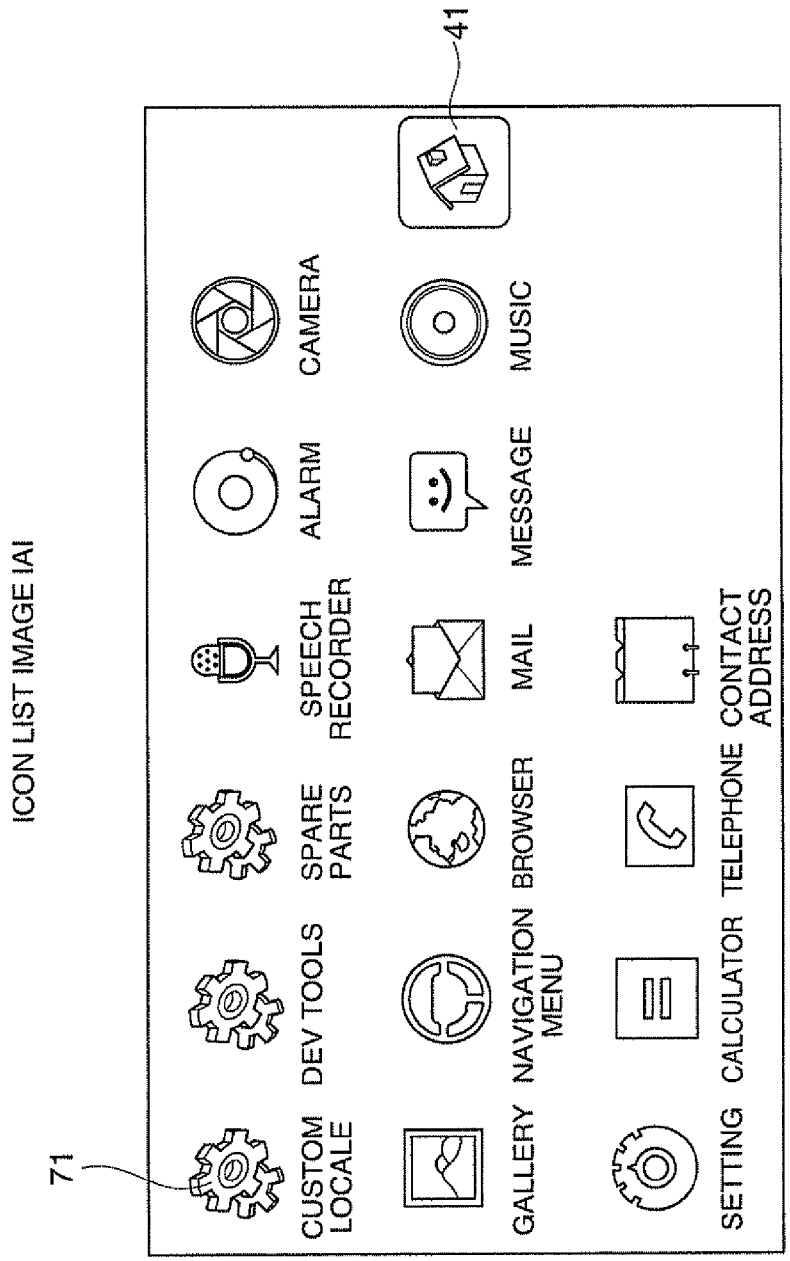
FIG. 6 is an explanatory view showing an example of an icon list image IAI.

FIG. 6 is an explanatory view showing an example of the icon list image IAI. The icon list image IAI is an image in which all icons 71 are two-dimensionally arranged. The icon list image IAI includes the home button 41, and when the home button 41 is designated and the click operation is performed, the head-mount type display device 100 changes the display image to the icon selection image ISI.

As stated above, in the icon selection mode of the head-mount type display device 100, the position designation figure group 50 to be displayed in the icon selection image ISI is selected, and the desired icon 71 can be selected by selecting the position designation figure 60 as the specific position designation figure 61 in the position designation figure group 50.

A-2-2. Display Image in Icon Arrangement Mode

Next, a description will be made on an image (virtual image VI recognized in user's visual field VR, see FIG. 3)

displayed by the head-mount type display device 100 in an icon arrangement mode. The icon arrangement mode is a mode for arranging an icon as an object in one of the position designation figure 60. In the icon selection mode in which the icon selection image ISI is displayed, when the depressed state of the determination key 15 is continued for a specified time (or when a long click operation is performed in the touch pad 14), a shift is made to the icon arrangement mode for setting (changing) the arrangement of the icon 71A arranged in the specific position designation figure 61 in the icon selection image ISI. The image display processing in the icon arrangement mode is mainly performed under control of the display control part 190, the image processing part 160 and the icon management part 152 and by the image display part 20.

Figure 7:
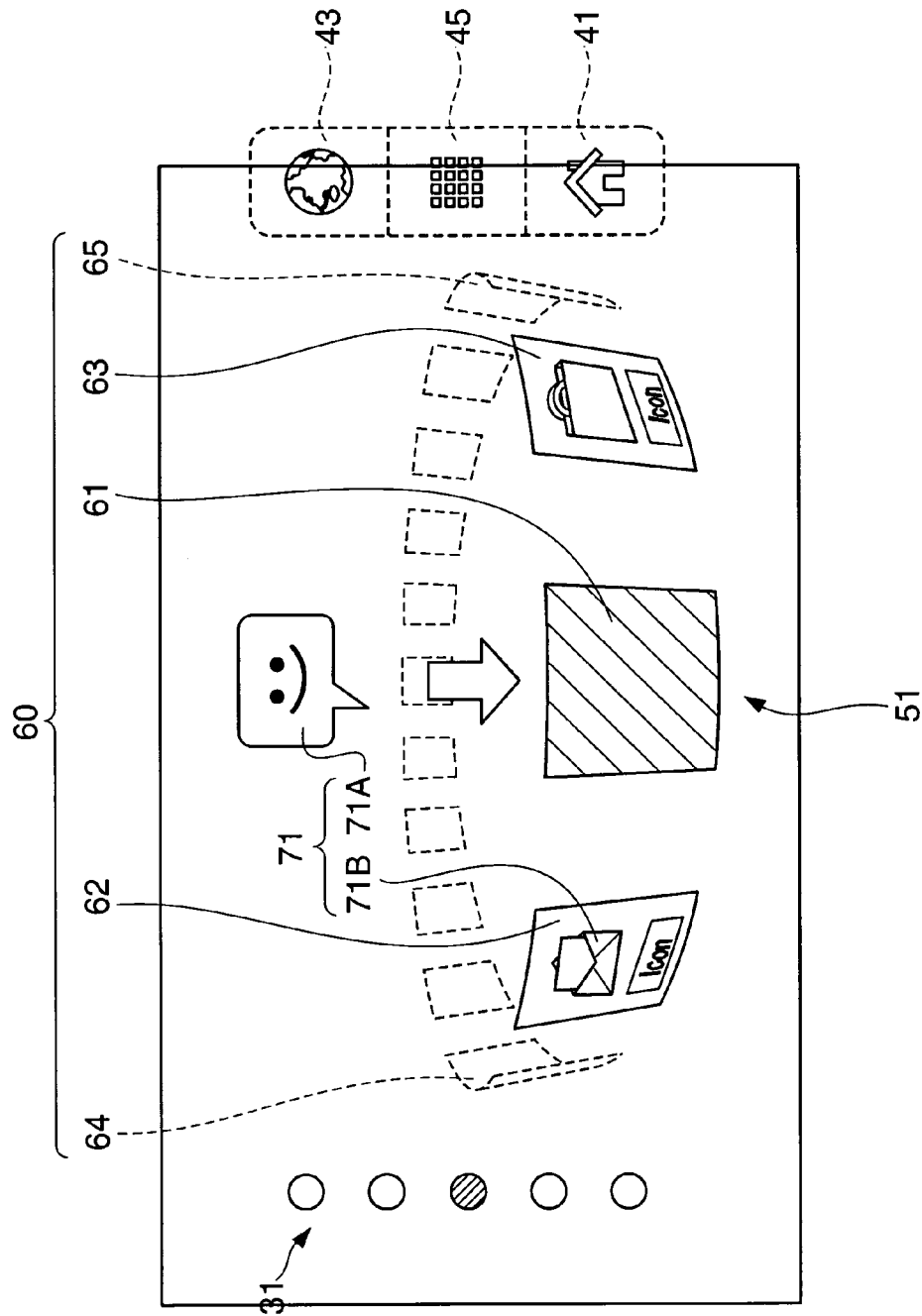
FIG. 7 is an explanatory view showing an example of an icon arrangement image IDI displayed in an icon arrangement mode.

FIG. 7 is an explanatory view showing an example of an icon arrangement image IDI displayed in the icon arrangement mode. As shown in FIG. 7, the icon arrangement image IDI is an image identical to the icon selection image ISI (FIG. 4 etc.) displayed in the icon selection mode except for some different points. Incidentally, the icon arrangement image IDI corresponds to the object arrangement image in the invention.

Specifically, the icon arrangement image IDI includes an arrangement position designation figure group 51 corresponding to the position designation figure group 50 of the icon selection image ISI. Here, that the arrangement position designation figure group 51 of the icon arrangement image IDI corresponds to the position designation figure group 50 of the icon selection image ISI means that the structure and contents of both are identical to each other except for some expressive different points in the image.

That is, similarly to the position designation figure group 50, the arrangement position designation figure group 51 includes N (N is an integer of 3 or more) position designation figure 60. The respective position designation figure 60 constituting the arrangement position designation figure group 51 are card-shaped figures, and are spaced from each other and arranged in a ring shape. The number N of the position designation figure 60 constituting the arrangement position designation figure group 51 is a fixed value and is 16 in this embodiment. Besides, in the respective position designation figure 60, the position designation figure 60 positioned at a nearer side of the ring-shaped arrangement of the arrangement position designation figure group 51 is displayed to be larger. The contour of at least one of the position designation figure 60 constituting the arrangement position designation figure group 51 is displayed to be more blurred than the position designation figure 60 positioned at a nearer side of the ring-shaped arrangement of the arrangement position designation figure group 51. Besides, the shape itself of each of the position designation figure 60 is also three-dimensionally represented. For example, the shape of the position designation figure 60 (62) positioned to the immediate left of the position designation figure 60 positioned at the center has a substantially trapezoidal shape whose height gradually decreases from right to left. That is, each of the position designation figure 60 is represented by using the rules of perspective. By this, in the icon arrangement image IDI, the three-dimensional representation of the ring-shaped arrangement of the arrangement position designation figure group 51 is emphasized.

Besides, one icon 71 can be arranged on each of the position designation figure 60 constituting the arrangement position designation figure group 51. Besides, in the icon arrangement image IDI, the ring formed by the arrangement of the respective position designation figure 60 constituting the arrangement position designation figure group 51 is not parallel to the image plane of the icon arrangement image IDI but has a specified inclination. Here, that the ring is not parallel to the image plane of the icon arrangement image IDI but has the specified inclination means that the imaginary plane including therein the ring is not parallel to the image plane of the icon arrangement image IDI. Besides, the image plane of the icon arrangement image IDI means the imaginary plane including therein the virtual image VI visually recognized by the user.

The inclination of the ring (the imaginary plane including the ring) in the icon arrangement image IDI with respect to the image plane of the icon arrangement image IDI is different from the inclination (substantially right angles) of the ring (the imaginary plane including the ring) in the icon selection image ISI with respect to the image plane of the icon selection image ISI. Thus, when the display is changed between similar images, for example, when the icon selection image ISI is changed to the icon arrangement image IDI, the user can be made to clearly recognize that the image is changed. Besides, in the embodiment, the inclination of the ring (the imaginary plane including the ring) in the icon arrangement image IDI with respect to the image plane of the icon arrangement image IDI is previously set so that at least a portion of each of all the position designation figure 60 does not overlap with the other position designation figure 60. Thus, in the icon arrangement image IDI, at least a portion of each of all the position designation figure 60 can be recognized without overlapping with the other position designation figure 60. Thus, even if the arrangement position designation figure group 51 is not rotated or moved, it is possible to grasp at a glance that the icon 71 is arranged on which of the position designation figure 60 constituting the arrangement position designation figure group 51 and the icon 71 is not arranged on which one.

Besides, in the icon arrangement image IDI, the position designation figure 60 positioned at the nearest side of the ring-shaped arrangement of the arrangement position designation figure group 51 is the specific position designation figure 61 in which the icon 71A can be arranged by the operation of the operation part 110. The specific position designation figure 61 is displayed to be opaque, and the position designation figure 60 other than the specific position designation figure 61 are displayed to be semi-transparent. From the difference of the display, the user can recognize the specific position designation figure 61 among the N position designation figure 60 constituting the arrangement position designation figure group 51.

Besides, the background portion of the icon arrangement image IDI is a black image. Accordingly, in the user' visual field VR (see FIG. 3), and in the background portion of the icon arrangement image IDI as the virtual image VI, the external scene SC behind can be completely transparently seen. Thus, the user can obtain such a visual experience that the arrangement position designation figure group 51 floats in front of the eyes. Besides, in the icon arrangement image IDI, since the specific position designation figure 61 is displayed to be opaque, the user gets an impression that the specific position designation figure 61 protrudes toward the user.

In the icon arrangement image IDI, the icon 71A as the object of arrangement setting is displayed above the specific position designation figure 61. In this embodiment, when the display is changed from the icon selection image ISI (FIG. 4 etc.) to the icon arrangement image IDI, an animation representation is performed such that the icon 71A arranged on the specific position designation figure 61 in the icon selection image ISI moves upward, and the inclination of the position designation figure group 50 is changed, and the display is changed to the icon arrangement image IDI. Besides, when the display is changed from the icon arrangement image IDI to the icon selection image ISI, an animation representation opposite thereto is performed.

When the operation part 110 receives a specified rotation instruction operation, in the icon arrangement image IDI, the N position designation figure 60 constituting the arrangement position designation figure group 51 rotate and move along the circumferential direction of the ring by the rotation amount corresponding to the rotation instruction operation, while the arrangement order is maintained. At this time, the icons 71 arranged on the respective position designation figure 60, together with the respective position designation figure 60, also rotate and move. The rotation instruction operation of the arrangement position designation figure group 51 is similar to the rotation instruction operation of the position designation figure group 50 in the icon selection mode. However, in the icon arrangement mode, irrespective of whether or not the icon 71 is arranged on the position designation figure 60, all the position designation figure 60 can become the specific position designation figure 61. Accordingly, the adjustment of the rotation amount as in the icon selection mode is not performed.

In the icon arrangement mode, when the determination key 15 is depressed, the icon 71A as the object of the arrangement setting is arranged on the specific position designation figure 61 at the time point, a shift is made to the icon selection mode, and the display is changed to the icon selection image ISI in which the new arrangement of the icon 71A is reflected. Incidentally, when the icon 71A is arranged in the icon arrangement image IDI, if the icon 71A is already arranged on the specific position designation figure 61, the icon 71A to be arranged on the specific position designation figure 61 is overwritten and set.

Besides, when the back key 17 is depressed in the icon arrangement image IDI (or the depressed state of the back key 17 is continued for a specified time), the presently selected icon 71 is deleted, a shift is made to the icon selection mode, and the display is changed to the icon selection image ISI.

Besides, five arrangement position designation figure groups 51 are set correspondingly to the five position designation figure groups 50. When a specified change-over instruction operation is received through the operation part 110 in the icon arrangement mode, the arrangement position designation figure group 51 to be displayed is changed in accordance with the set order. Similarly to the icon selection image ISI, the icon arrangement image IDI includes the indicator 31 to identify the arrangement position designation figure group 51 under display.

Incidentally, the operation in the icon arrangement mode can also be performed by the touch pad 14. For example, when the position of the specific position designation figure 61 of the icon arrangement image IDI is designated through the touch pad 14 and the click operation is performed, similarly to the time of depression of the determination key 15, the icon 71A is arranged on the specific position designation figure 61. When the position designation figure 60 (62) positioned to the immediate left of the specific position designation figure 61 is designated and the click operation is performed, similarly to the time of depression of the left key of the cross key 16, the whole of the arrangement position designation figure group 51 rotates and moves (counterclockwise when viewed from above), and stops in the state where the position designation figure 60 (62) positioned to the immediate left of the specific position designation figure 61 before the rotation movement becomes the new specific position designation figure 61. Similarly, the position designation figure 60 (64) positioned to the immediate left of the position designation figure which is positioned to the immediate left of the specific position designation figure 61, the position designation figure 60 (63) positioned to the immediate right of the specific position designation figure 61, or the position designation figure 60 (65) positioned to the immediate right of the position designation figure which is positioned to the immediate right of the position designation figure 60 (63) is designated and the click operation is performed, the whole of the arrangement position designation figure group 51 rotates and moves, and stops in the state where the position designation figure 60 designated by the click operation becomes the specific position designation figure 61.

Besides, when one mark of the indictor 31 is designated through the touch pad 14 and the click operation is performed in the icon arrangement image IDI, the display is changed over so that the arrangement position designation figure group 51 corresponding to the designated mark is displayed. Incidentally, the home button 41, the list button 45 and the browser button 43 can not be selected in the icon arrangement image IDI. When another area is designated through the touch pad 14 and the click operation is performed in the icon arrangement image IDI, the icon arrangement mode is cancelled, a shift is made to the icon selection mode, and the icon selection image ISI is displayed.

Besides, when the rightward flick operation is performed in the touch pad 14, similarly to the time of depression of the left key of the cross key 16, the whole of the arrangement position designation figure group 51 rotates and moves (counterclockwise when viewed from above). When the leftward flick operation is performed, similarly to the time of depression of the right key of the cross key 16, the whole of the arrangement position designation figure group 51 rotates and moves (clockwise when viewed from above). Besides, when the downward flick operation is performed in the touch pad 14, similarly to the time of depression of the lower key of the cross key 16, the arrangement position designation figure group 51 displayed in the icon arrangement image IDI is changed to the subsequent arrangement position designation figure group 51. When the upward flick operation is performed, similarly to the time of depression of the upper key of the cross key 16, the arrangement position designation figure group 51 displayed in the icon arrangement image IDI is changed to the previous arrangement position designation figure group 51.

As stated above, in the icon arrangement mode of the head-mount type display device 100, the arrangement position designation figure group 51 to be displayed in the icon arrangement image IDI is selected, and the position designation figure 60 as the specific position designation figure 61 is selected in the arrangement position designation figure group 51, so that the icon 71A can be arranged at the desired position.

Incidentally, the condition of the shift to the icon arrangement mode is not limited to the case where the depressed state of the determination key 15 is continued for the specified time (or the case where the long click operation is performed in the touch pad 14) when the icon selection image ISI is displayed, and the shift is performed also in other conditions. For example, when the icon list image IAI (FIG. 6) is displayed, if a specified operation is performed through the operation part 110, a shift is made to the icon arrangement mode for setting the arrangement of the selected icon.

Figure 8:
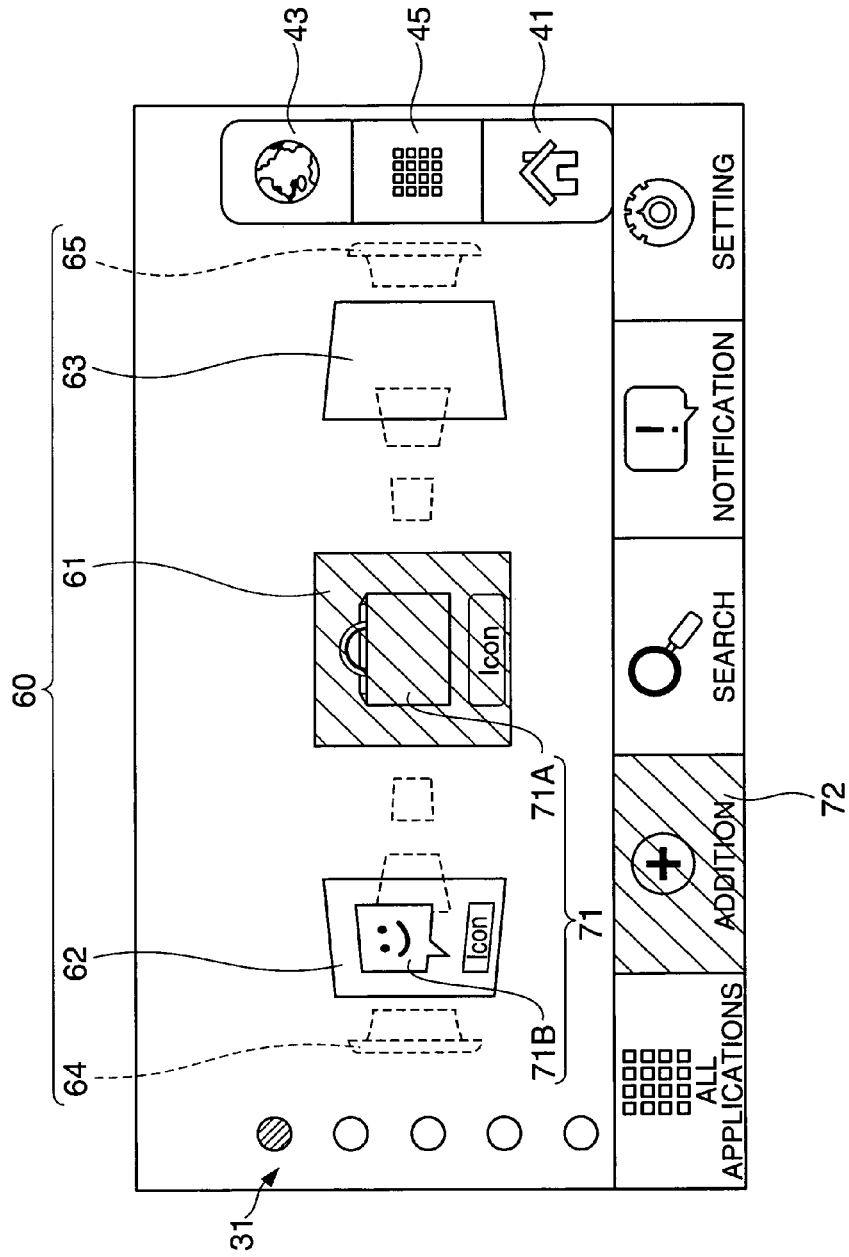
FIG. 8 is an explanatory view showing an example of the icon selection image ISI in which a menu screen is added.
Figure 9:
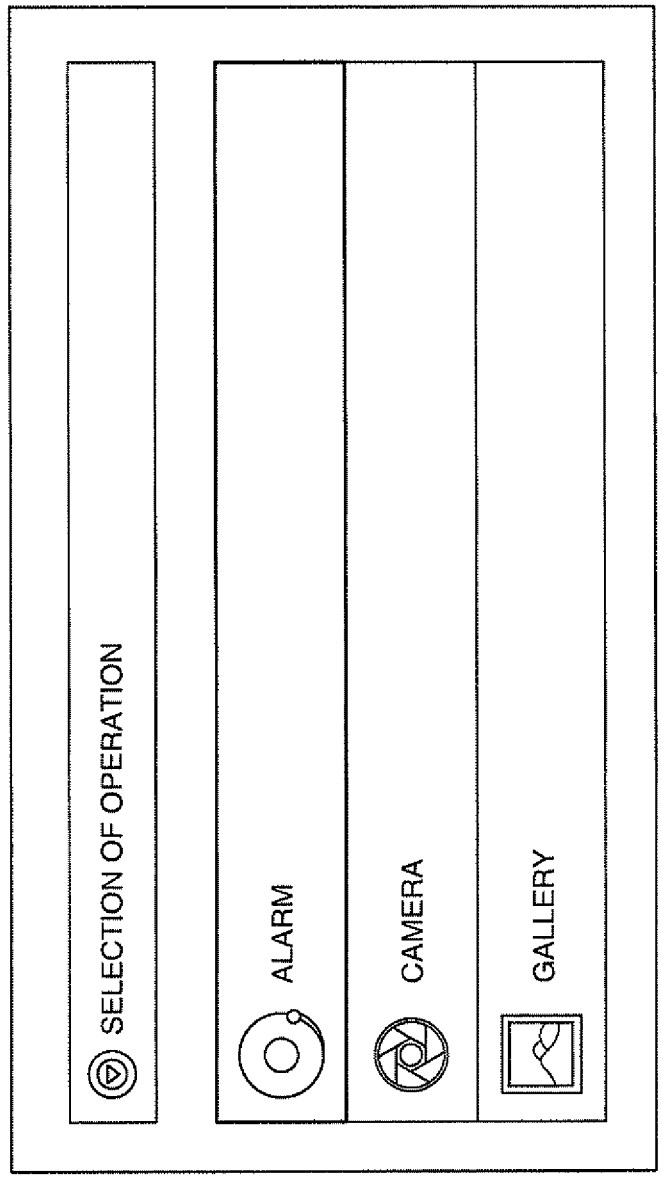
FIG. 9 is an explanatory view showing an example of an addition dialog AD.

Besides, when the icon selection image ISI is displayed in the icon selection mode, if a specified operation is performed through the operation part 110, a menu screen is added to the icon selection image ISI. FIG. 8 is an explanatory view for explaining an example of the icon selection image ISI in which the menu screen is added. When an addition button 72 in the menu screen added to the icon selection image ISI is selected, an addition dialog AD for selecting an object to be added is displayed. FIG. 9 is an explanatory view showing an example of the addition dialog AD. In the addition dialog AD, when an operation of selecting a desired icon is performed, a shift is made to the icon arrangement mode for setting the arrangement of the selected icon.

Alternatively, when a specified operation is performed through the operation part 110 at the time when the arrangement of the icon 71 is not set at all in the icon selection mode, the addition dialog AD (FIG. 9) is displayed. When an operation of selecting a desired icon is performed in the addition dialog AD, a shift is made to the icon arrangement mode for setting the arrangement of the selected icon.

As described above, the head-mount type display device 100 of the embodiment can display the icon selection image ISI for selecting the icon 71. The icon selection image ISI includes the position designation figure group 50 including the N (N is an integer of 3 or more) position designation figure 60 on each of which one icon 71 can be arranged. The respective position designation figure 60 constituting the position designation figure group 50 are arranged in the ring-shape which is not parallel to the image plane of the icon selection image ISI. When the operation part 110 receives the specified rotation instruction operation, in the icon selection image ISI, the position designation figure group 50, together with the icons 71 arranged on the respective position designation figure 60, rotates and moves along the circumferential direction of the ring by the rotation amount corresponding to the rotation instruction operation. In the stop state of the rotation movement, the specific position designation figure 61 in the position designation figure group 50 is displayed so that the icon 71A arranged on the specific position designation figure 61 can be selected. As stated above, in the head-mount type display device 100 of the embodiment, the number N of the position designation figure 60 constituting the position designation figure group 50 displayed in the icon selection image ISI does not increase or decrease. Thus, the arrangement mode of the position designation figure 60, such as the interval between the position designation figure 60 and the sizes of the position designation figure 60, is not changed, and the position designation figure 60 in the same arrangement mode are always displayed. Thus, irrespective of the arrangement state of the icons 71 in the position designation figure group 50, the user hardly feels uncomfortable on the screen structure. Besides, since the number N of the position designation figure 60 constituting the position designation figure group 50 displayed in the icon selection image ISI does not increase or decrease, it does not occur that the number of the position designation figure 60 displayed on one screen is excessively large, so that the desired icon arranged on the position designation figure 60 is hard to find. Besides, it does not occur that the number of the position designation figure 60 displayed on one screen is excessively small, so that it is hard to recognize that the position designation figure 60 are arranged in the ring shape and it becomes difficult to intuitively perform the operation of rotating and moving the position designation figure group 50. Besides, also when the design taste of the icons 71 is irregular, the image can be made to have a certain sensation of unity by the existence of the position designation figure 60. Accordingly, in the head-mount type display device 100 of the embodiment, the user's convenience (usability) can be improved.

Besides, in the embodiment, in the icon selection image ISI, the rotation amount of the position designation figure group 50 is adjusted so that the position designation figure 60 in which the icon 71 is not arranged does not become the specific position designation figure 61. Thus, it does not occur that the unarranged position designation figure becomes the specific position designation figure 61 and the rotation instruction operation is again required, and the user's convenience can be further improved.

Besides, in the embodiment, in the icon selection image ISI, the specific position designation figure 61 is the position designation figure 60 at the nearest position of the ring-shaped arrangement of the position designation figure group 50, the specific position designation figure 61 is displayed to be opaque, and the position designation figure 60 other than the specific position designation figure 61 are displayed to be semi-transparent. Thus, the selectable specific position designation figure 61 can be displayed to be more noticeable than the other position designation figure 60, and the presently selected icon 71A can be recognized at a glance. Besides, the inclination of the ring-shaped arrangement with respect to the image plane of the icon selection image ISI is set at such an angle that at least a portion of at least one position designation figure 60 positioned at a far side overlaps with the position designation figure 60 positioned at a near side. However, since the position designation figure 60 other than the specific position designation figure 61 are displayed to be semi-transparent, the representation can be made such that the specific position designation figure 61 is emphasized without impairing the three-dimensional representation.

Besides, in the embodiment, in the icon selection image ISI, the respective position designation figure 60 are displayed such that the position designation figure 60 positioned at a nearer side of the ring-shaped arrangement is displayed to be larger. Besides, the contour of at least one position designation figure 60 is displayed to be more blurred than the position designation figure 60 positioned at a nearer side of the ring-shaped arrangement. Thus, the three-dimensional representation of the position designation figure group 50 can be emphasized.

Besides, in the embodiment, the plural position designation figure groups 50 are set, and when the operation part 110 receives the specified change-over instruction operation, the position designation figure group 50 to be displayed in the icon selection image ISI is changed to the other position designation figure group 50. Thus, while the number of the position designation figure 60 displayed on one screen is fixed to N, the arrangement and selection of the icons 71 the number of which exceeds N can be performed.

Besides, in the embodiment, when the display of the position designation figure group 50 is changed, if the icon 71A is not arranged on the specific position designation figure 61 in the newly displayed position designation figure group 50, the position designation figure group 50 is rotated and moved so that the position designation figure 60 in which the object is arranged becomes the specific position designation figure 61. Thus, it does not occur that after the display of the position designation figure group 50 is changed, the unarranged position designation figure becomes the specific position designation figure 61 and the rotation instruction operation is again required, and the user's convenience can be further improved.

Besides, the head-mount type display device 100 of the embodiment can display the icon arrangement image IDI for arranging the icon 71 on the position designation figure 60. The icon arrangement image IDI includes the arrangement position designation figure group 51 corresponding to the position designation figure group 50 in the icon selection image ISI. When the operation part 110 receives the specified rotation instruction operation, in the icon arrangement image IDI, the arrangement position designation figure group 51, together with the icons 71 arranged on the respective position designation figure 60, rotates and moves along the circumferential direction of the ring by the rotation amount corresponding to the rotation instruction operation, and the display becomes such that the icon 71A can be arranged on the specific position designation figure 61 in the arrangement position designation figure group 51. As stated above, in the head-mount type display device 100 of the embodiment, since the number N of the position designation figure 60 constituting the arrangement position designation figure group 51 does not increase or decrease also in the icon arrangement image IDI, the user's convenience (usability) at the time when the icon 71 is arranged on the position designation figure 60 can be improved.

Besides, in the embodiment, in the icon arrangement image IDI, the inclination of the ring-shaped arrangement of the arrangement position designation figure group 51 with respect to the image plane of the icon arrangement image IDI is set at such an angle that at least a portion of each of all the position designation figure 60 does not overlap with the other position designation figure 60. Thus, even if the arrangement position designation figure group 51 is not rotated or moved, it is possible to grasp at a glance that the icon 71 is arranged on which of the position designation figure 60 constituting the arrangement position designation figure group 51 and the icon 71 is not arranged on which one, and the user's convenience at the time when the icon 71 is arranged on the position designation figure 60 can be further improved.

B. Modified Example

Incidentally, the invention is not limited to the above embodiment, and can be carried out in various modes within the scope not departing from the gist thereof. For example, the following modifications can be made.

B1. Modified Example 1

The structure of the head-mount type display device 100 in the above embodiment is merely an example, and can be variously modified. For example, in the above embodiment, although the head-mount type display device 100 includes the touch pad 14, the determination key 15, the cross key 16 and the back key 17 as the operation part 110, in addition to these, other operation devices such as an operation stick, a keyboard and a mouse may be included. Besides, the head-mount type display device 100 may not include at least one of the foregoing operation devices as the operation part 110.

Besides, in the above embodiment, the cross key 16 can be changed to an operation device having another shape capable of performing up, down, right and left direction instructions. Besides, the touch pad 14 can be changed to a touch pad of another type, such as resistance film type, pressure detection type or optical type. Incidentally, the touch pad 14 may be an absolute coordinate type touch pad in which an area of an operation surface and an effective image display area for virtual image VI display are in one-to-one correspondence with each other, or may be a relative coordinate type touch pad in which the area of the operation surface and the effective image display area for the virtual image VI display are not in one-to-one correspondence with each other.

Besides, in the embodiment, although the control part 10 and the image display part 20 are wired-connected through the connection part 40, the control part 10 and the image display part 20 may be connected through a signal transmission path such as wireless LAN, infrared ray communication or BLUETOOTH.

Besides, in the embodiment, although the content data is supplied from the external equipment OA through the interface 180, content data may be stored in the storage part 120 of the control part 10 of the head-mount type display device 100, and the image display may be performed based on the content data stored in the storage part 120.

Besides, in the embodiment, although the LCD and the light source are used as the structure to generate the image light, instead of these, another display element such as an organic EL display may be adopted. Besides, the earphones 32 may be omitted.

Besides, in the embodiment, the head-mount type display device 100 may cause the user to visually recognize a two-dimensional image by guiding image lights representing the same image to the right and left eyes of the user, or may cause the user to visually recognize a three-dimensional image by guiding image lights representing different images to the right and left eyes of the user.

Besides, in the embodiment, although the image display part 20 mounted like a pair of glasses is adopted, an image display part having another shape, such as an image display part mounted like, for example, a hat, may be adopted as the image display part. Besides, the image display part may be a normal flat display device (liquid crystal display device, plasma display device, organic electro-luminescence (EL) display device, etc.). Also in this case, the connection between the control part 10 and the image display part 20 may be connection through a wired signal transmission path, or may be connection through a wireless signal transmission path. By doing so, the control part 10 can be used as a remote control of the normal flat display device.

Besides, in the embodiment, although the head-mount type display device 100 is the both-eye type optical transmission head-mount type display device, the invention can be similarly applied to a head-mount type display device of another type such as, for example, video transmission type, non-transmission type or single-eye type. Further, the invention can be applied to another information processing apparatus such as a personal computer, a projector, a television or a portable information terminal in addition to the head-mount type display device. For example, when the invention is applied to the television, the position designation figure 60 other than the specific position designation figure 61 in the icon selection image ISI or the icon arrangement image IDI are displayed to be semi-transparent, and the display is made such that other objects positioned behind the position designation figure 60 and the color (normally black) of the screen itself can be visually recognized therethrough. Besides, the invention can be applied also to a control device (for example, a remote control) to control an information processing apparatus including a display part, such as the head-mount type display device, personal computer, projector, television or portable information terminal.

Besides, in the embodiment, a part of the structure realized by hardware may be replaced by software, or a part of the structure realized by software may be replaced by hardware. For example, in the embodiment, although the image processing part 160 and the sound processing part 170 are realized in such a way that the CPU 140 reads computer programs and executes them, these function parts may be realized by hardware circuits.

Besides, when a part of or all of the functions of the invention are realized by software, the software (computer program) can be provided in a form stored in a computer readable recording medium. In the invention, the "computer readable recording medium" includes not only a portable recording medium such as a flexible disk or a CD-ROM, but also an internal storage device in a computer, such as various RAMS and ROMs, and an external storage device fixed to the computer, such as a hard disk.

B2. Modified Example 2

The structure of the icon selection image ISI or the icon arrangement image IDI in the embodiment is merely an example, and can be variously modified. For example, in the embodiment, although the number N of the position designation figure 60 constituting the position designation figure group 50 included in the icon selection image ISI (or the arrangement position designation figure group 51 included in the icon arrangement image IDI) is an integer of 3 or more, in order to cause the ring-shaped arrangement of the position designation figure group 50 (or the arrangement position designation figure group 51) to be easily visually recognized, the number N of the position designation figure 60 is preferably an integer of 8 or more, more preferably 12 or more, and more preferably 16 or more. However, from the viewpoint of preventing overlapping between the position designation figure 60 while the size of the position designation figure 60 is maintained to a certain degree, the number N of the position designation figure 60 constituting the position designation figure group 50 (or the arrangement position designation figure group 51) is preferably 32 or less.

Besides, in the icon selection image ISI or the icon arrangement image IDI, the inclination of the ring-shaped arrangement of the position designation figure group 50 or the arrangement position designation figure group 51 with respect to the image plane of the icon selection image ISI can be changed to an arbitrary value as long as the icon selection image ISI or the icon arrangement image IDI does not become parallel to the image plane of the icon selection image ISI. Besides, in the icon selection image ISI or the icon arrangement image IDI, the size, blur degree of contour, shape and the like of each of the position designation figure 60 constituting the position designation figure group 50 or the arrangement position designation figure group 51 can be arbitrarily changed.

Besides, in the icon selection image ISI or the icon arrangement image IDI, the position of the specific position designation figure 61 in the position designation figure group 50 or the arrangement position designation figure group 51 can be arbitrarily changed. Besides, the opaque/semi-transparent display of the specific position designation figure 61 and the position designation figure 60 other than the specific position designation figure 61 can be arbitrarily changed.

Besides, in the embodiment, although the five position designation figure groups 50 (or the arrangement position designation figure groups 51, the same applies to the following) are set, the number of the position designation figure groups 50 may be 4 or less, or 6 or more. Besides, the number of the position designation figure groups 50 may be increased or decreased according to the user's operation.

Besides, the object arranged on the position designation figure 60 is not limited to the icon 71, and may be another object such as a folder or a file. Besides, the attributes of the respective position designation figure groups 50 may be set such that, for example, one position designation figure group 50 is for icon arrangement, and the other position designation figure group 50 is for folder arrangement.

The entire disclosure of Japanese Patent Application No. 2011-037787, filed Feb. 24, 2011 is expressly incorporated by reference herein.

What is claimed is:

1. An information processing apparatus comprising:
an operation part; and
a display part to display an object selection image for selecting an object, wherein
the object selection image includes a position designation figure group including N (N is an integer of 3 or more) position designation figures which are arranged in a ring shape and to each of which one object of a plurality of objects can be assigned so that each of the position designation figures is either (i) an assigned position designation figure to which one of the objects is assigned or (ii) an unassigned position designation figure to which one of the objects is not assigned,
when the operation part receives a specified rotation instruction operation, in the object selection image, the display part
(i) rotates and moves the position designation figure group, together with any of the objects assigned to the position designation figures, along a circumferential direction of the ring by a rotation amount corresponding to the rotation instruction operation, and
(ii) causes a specific position designation figure, which is one of the assigned position designation figures and is positioned at a specific position in the position designation figure group corresponding to a stationary region where the rotation instruction operation causes movement of the position designation figure group to stop the specific position designation figure, to be displayed to enable recognition that the object assigned to the specific position designation figure can be selected by an operation of the operation part,
in the object selection image, the display part adjusts the rotation amount so that the unassigned position designation figure does not stop at the specific position and does not become the specific position designation figure, and
the number N of the position designation figures is unchanged when a previously unassigned one of the objects is assigned to one of the position designation figures.

2. The information processing apparatus according to claim 1, wherein in the object selection image, the display part displays the specific position designation figure to be opaque, and displays the position designation figure other than the specific position designation figure to be semi-transparent.

3. The information processing apparatus according to claim 2, wherein in the object selection image, an imaginary plane including the ring is not parallel to an image plane of the object selection image, and the specific position is a position at a nearest side of the ring-shaped arrangement.

4. The information processing apparatus according to claim 3, wherein in the object selection image, the display part displays the position designation figure positioned at a nearer side of the ring-shaped arrangement to be larger.

5. The information processing apparatus according to claim 3, wherein in the object selection image, the display part displays a contour of at least one position designation figure to be more blurred than the position designation figure positioned at a nearer side of the ring-shaped arrangement.

6. The information processing apparatus according to claim 3, wherein in the object selection image, an inclination of the imaginary plane with respect to the image plane of the object selection image is set at such an angle that at least a portion of at least one position designation figure positioned at a far side of the ring-shaped arrangement overlaps with the position designation figure positioned at a near side.

7. The information processing apparatus according to claim 1, wherein the display part sets a plurality of position designation figure groups, and when the operation part receives a specified change-over instruction operation, in the object selection image, the display part changes the position designation figure group to be displayed to another position designation figure group.

8. The information processing apparatus according to claim 7, wherein the display part sets an order to each of the plurality of the position designation figure groups, and each time the operation part receives a specified sequential change-over instruction operation, in the object selection image, the display part changes the position designation figure group to be displayed in accordance with the order.

9. The information processing apparatus according to claim 7, wherein when display of the position designation figure group is changed, if the position designation figure in which an object is not assigned to is positioned at the specific position in the position designation figure group to be newly displayed, the display part rotates and moves the position designation figure group along the peripheral direction of the ring so that the position designation figure in which the object is assigned to is positioned at the specific position.

10. The information processing apparatus according to claim 1, wherein
when the operation part receives a specified mode change-over instruction operation, the display part displays an object assignment image which is an image for assigning an object to the position designation figure and includes an assignment position designation figure group corresponding to the position designation figure group in the object selection image, and
when the operation part receives the specified rotation instruction operation, in the object assignment image, the display part rotates and moves the assignment position designation figure group, together with the object assigned to each of the position designation figures, along the circumferential direction of the ring by the rotation amount corresponding to the rotation instruction operation, and causes the specific position designation figure in the assignment position designation figure group to be displayed to enable recognition that the object can be assigned by the operation of the operation part.

11. The information processing apparatus according to claim 10, wherein
in the object assignment image, an imaginary plane including the ring is not parallel to an image plane of the object selection image, and
an inclination of the imaginary plane in the object assignment image with respect to the imaginary plane of the object assignment image is different from an inclination of the imaginary plane in the object selection image with respect to the image plane of the object selection image.

12. The information processing apparatus according to claim 11, wherein
in the object assignment image, the display part displays the specific position designation figure to be opaque, and displays the position designation figure other than the specific position designation figure to be semi-transparent, and
the inclination of the imaginary plane in the object assignment image with respect to the image plane of the object assignment image is set to such an angle that at least a portion of each of all the position designation figures does not overlap with the other position designation figure.

13. A control method of an information processing apparatus including an operation part and a display part to display an object selection image for selecting an object, the object selection image including a position designation figure group including N (N is an integer of 3 or more) position designation figures which are arranged in a ring shape and to each of which one object of a plurality of objects can be assigned so that each of the position designation figures is either (i) an assigned position designation figure to which one of the objects is assigned or (ii) an unassigned position designation figure to which one of the objects is not assigned, and the method comprising:
rotating and moving the position designation figure group, together with any of the objects assigned to the position designation figures, along a circumferential direction of the ring by a rotation amount corresponding to a rotation instruction operation in the object selection image when the operation part receives the specified rotation instruction operation; and
causing a specific position designation figure, which is one of the assigned position designation figures and is positioned at a specific position in the position designation figure group corresponding to a stationary region where the rotation instruction operation causes movement of the position designation figure group to stop the specific position designation figure, to be displayed to enable recognition that the object assigned to the specific position designation figure can be selected by an operation of the operation part, wherein
in the object selection image, the display part adjusts the rotation amount so that the unassigned position designation figure does not stop at the specific position and does not become the specific position designation figure, and
the number N of the position designation figures is unchanged when a previously unassigned one of the objects is assigned to one of the position designation figures.

14. A transmission head-mount type display device comprising:
an image display part that (i) includes an image light generation part to generate an image light representing an image, and a light guide part to guide the generated image light to eyes of a user, and (ii) causes the user to visually recognize a virtual image in a state where the device is mounted on a head of the user; and
an operation part, wherein
the image display part displays an object selection image including a position designation figure group including N (N is an integer of 3 or more) position designation figures which are arranged in a ring shape and to each of which one object of a plurality of objects can be assigned so that each of the position designation figures is either (i) an assigned position designation figure to which one of the objects is assigned or (ii) an unassigned position designation figure to which one of the objects is not assigned,
when the operation part receives a specified rotation instruction operation, in the object selection image, the image display part
(i) rotates and moves the position designation figure group, together with any of the objects assigned to the position designation figures, along a circumferential direction of the ring by a rotation amount corresponding to the rotation instruction operation, and (ii) causes a specific position designation figure, which is one of the assigned position designation figures and is positioned at a specific position in the position designation figure group corresponding to a stationary region where the rotation instruction operation causes movement of the position designation figure group to stop the specific position designation figure, to be displayed to enable recognition that the object assigned to the specific position designation figure can be selected by an operation of the operation part, in the object selection image, the display part adjusts the rotation amount so that the unassigned position designation figure does not stop at the specific position and does not become the specific position designation figure, and the number N of the position designation figures is unchanged when a previously unassigned one of the objects is assigned to one of the position designation figures.

* * * * *